(12) United States Patent
Murakami

(10) Patent No.: US 11,009,719 B2
(45) Date of Patent: May 18, 2021

(54) LENS DRIVE DEVICE, CAMERA MODULE, AND CAMERA-MOUNTED DEVICE

(71) Applicant: Tomoyuki Murakami, Tokyo (JP)

(72) Inventor: Tomoyuki Murakami, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 149 days.

(21) Appl. No.: 16/077,071

(22) PCT Filed: Feb. 10, 2016

(86) PCT No.: PCT/JP2016/000709
§ 371 (c)(1),
(2) Date: Aug. 10, 2018

(87) PCT Pub. No.: WO2017/138041
PCT Pub. Date: Aug. 17, 2017

(65) Prior Publication Data
US 2019/0041661 A1    Feb. 7, 2019

(51) Int. Cl.
*G02B 13/08* (2006.01)
*G02B 27/64* (2006.01)
(Continued)

(52) U.S. Cl.
CPC ............. *G02B 27/646* (2013.01); *G02B 7/08* (2013.01); *G02B 7/09* (2013.01); *G03B 3/10* (2013.01);
(Continued)

(58) Field of Classification Search
CPC .......... G02B 7/102; G02B 7/08; G02B 7/282; G02B 7/09; G02B 7/36; G02B 7/04;
(Continued)

(56) References Cited

U.S. PATENT DOCUMENTS 10,168,506 B2 *  1/2019  Chen ................... G02B 27/646
2013/0050828 A1  2/2013  Sato et al.
(Continued)

FOREIGN PATENT DOCUMENTS

JP     2012-177753 A    9/2012
JP     2013-210550 A    10/2013
(Continued)

OTHER PUBLICATIONS

International Search Report from International Application No. PCT/JP2016/000709 dated May 10, 2016.

*Primary Examiner* — William R Alexander
*Assistant Examiner* — Tamara Y. Washington
(74) *Attorney, Agent, or Firm* — Brundidge & Stanger, P.C.

(57) ABSTRACT

This lens drive device is provided with an AF drive part and image stabilization drive part using the driving force of a VCM. a pair of power supply suspension wires and a pair of signal suspension wires couple an image stabilization fixed part with an AF fixed part. The AF fixed part includes an AF power supply line, a signal line, a coil power supply line, and an AF control part. The AF control part includes: a Hall element detecting the position of the AF movable part in the optical axis direction; a coil control part controlling the energizing current for an AF coil on the basis of a control signal supplied through the signal suspension wires and the detection results of the Hall element; and an autofocus circuit board whereon the Hall element and the coil control part are mounted.

6 Claims, 15 Drawing Sheets

(51) Int. Cl.
*G02B 7/08* (2021.01)
*G03B 5/00* (2021.01)
*H04N 5/225* (2006.01)
*G03B 3/10* (2021.01)
*H04N 5/232* (2006.01)
*G02B 7/09* (2021.01)
*G03B 13/36* (2021.01)

(52) U.S. Cl.
CPC ............... *G03B 5/00* (2013.01); *G03B 13/36* (2013.01); *H04N 5/2253* (2013.01); *H04N 5/2254* (2013.01); *H04N 5/232* (2013.01); *G03B 2205/0007* (2013.01); *G03B 2205/0069* (2013.01)

(58) Field of Classification Search
CPC .... G02B 7/10; H04N 5/23212; H04N 5/2254; H04N 5/23296; H04N 5/23293; H04N 5/2257

USPC ........................................................ 359/698
See application file for complete search history.

(56) References Cited

U.S. PATENT DOCUMENTS

| | | |
|---|---|---|
| 2014/0327965 A1 | 11/2014 | Chen et al. |
| 2015/0168668 A1 | 6/2015 | Wu et al. |
| 2015/0365568 A1 | 12/2015 | Topliss et al. |
| 2017/0254979 A1 | 9/2017 | Bai |

FOREIGN PATENT DOCUMENTS

| | | | |
|---|---|---|---|
| JP | 2014-219675 A | | 11/2014 |
| JP | 2015-114670 A | | 6/2015 |
| JP | 2015191213 A | * | 11/2015 |
| JP | 2016-051078 A | | 4/2016 |
| WO | 2014/100516 A1 | | 6/2014 |

* cited by examiner

LENS DRIVE DEVICE, CAMERA MODULE, AND CAMERA-MOUNTED DEVICE

TECHNICAL FIELD

The present invention relates to a lens driving device for auto-focusing and shake-correcting, a camera module, and a camera-mounted device.

BACKGROUND ART

In general, a small-sized camera module is mounted in mobile terminals, such as smartphones. A lens driving device having an autofocus function of automatically performing focusing during capturing of a subject (hereinafter referred to as "AF (Auto Focus) function") and a shake-correcting function (hereinafter referred to as "OIS (Optical Image Stabilization) function") for reducing irregularities of an image by correcting shake (vibration) caused during capturing of an image is applied in such a camera module (see e.g. Patent Literatures (hereinafter referred to as "PTLs") 1 and 2).

The lens driving device for auto-focusing and shake-correcting is provided with an auto-focusing driving part for moving a lens part in the optical axis direction (hereinafter referred to as "AF driving part") and a shake-correcting driving part for swaying a lens part in a plane orthogonal to the optical axis direction (hereinafter referred to as "OIS driving part"). In PTLs 1 and 2, a voice coil motor (VCM) is employed in the AF driving part and the OIS driving part.

The AF driving part of a VCM-driven system includes, for example, an auto-focusing coil part (hereinafter referred to as "AF coil part") disposed at the periphery of the lens part, and an auto-focusing magnet part (hereinafter referred to as "AF magnet part") disposed to be radially spaced apart from the AF coil part. An autofocus movable part (hereinafter referred to as "AF movable part") including the lens part and the AF coil part is supported by an auto-focusing supporting member (hereinafter referred to as "AF supporting member" (e.g. plate spring)) such that the AF movable part is radially spaced apart from an autofocus fixing part (hereinafter referred to as "AF fixing part") including the AF magnet part. Focusing is automatically carried out by moving the AF movable part in the optical-axis direction by utilizing a driving force of the voice coil motor composed of the AF coil part and the AF magnet part.

The OIS driving part of the VCM-driven system includes, for example, a shake-correcting magnet part (hereinafter referred to as "OIS magnet part") disposed in the AF driving part and a shake-correcting coil part (hereinafter referred to as "OIS coil part") disposed to be spaced apart from the OIS magnet part in the optical-axis direction. A shake-correcting movable part (hereinafter referred to as "OIS movable part") including the AF driving part and the OIS magnet part is supported by shake-correcting supporting members (hereinafter referred to as "OIS supporting members" (e.g. suspension wires)) such that the shake-correcting movable part is spaced apart in the optical-axis direction from a shake-correcting fixing part (hereinafter referred to as "OIS fixing part") including the OIS coil part. Shake correction is performed by swaying the OIS movable part with respect to the OIS fixing part in the plane orthogonal to the optical-axis direction by utilizing the driving force of the voice coil motor composed of the OIS magnet part and the OIS coil part.

In the aforementioned lens driving device, electricity is supplied from the OIS fixing part to the AF coil part. Accordingly, a power-supplying path for the AF coil part is provided between the OIS movable part including the AF driving part and OIS fixing part. For example, a pair of suspension wires among multiple suspension wires that are the OIS supporting members is used as the power-supplying path for the AF coil part.

In addition, there has recently been a proposed AF driving part including a position detecting part for detecting the position of the AF movable part along the optical-axis direction. The position detecting part includes, for example, a Hall element that utilizes the Hall effect to detect a change in magnetic field and a position detecting board for supplying electricity to the Hall element and for extracting a detection signal. Quick and accurate focusing is made possible by controlling the energization current flowing through the AF coil part by feeding back the detection result of the position detecting part, so that the reliability of the AF driving part improves.

CITATION LIST

Patent Literature

PTL 1
Japanese Patent Application Laid-Open No. 2013-210550
PTL 2
Japanese Patent Application Laid-Open No. 2012-177753

SUMMARY OF INVENTION

Technical Problem

Traditionally, feedback control based on the detection result of the position detecting part is performed by an external control part (for example, camera module). Thus, when the position detecting part is disposed in the AF driving part, a power-supplying path and a signal path for the Hall element are required between the OIS movable part and the OIS fixing part in addition to a power-supplying path for the AF coil part. When the suspension wires that are the OIS supporting members are utilized as the power-supplying path and signal path for the Hall element, two pairs of suspension wires are required. That is, as the configuration of the OIS supporting members, the total of three pairs of suspension wires (six suspension wires) including the pair used as the power-supplying path for the AF coil part are required. The increased number of suspension wires increases the number of assembly steps and, additionally, influences the behavior during shake correction, thus resulting in a complicated design.

An object of the present invention is to provide a lens driving device, camera module, and camera-mounted device for which the configuration of OIS supporting members used for driving an AF coil part and a position detecting part can be simplified and, moreover, the reliability can be improved.

Solution to Problem

A lens driving device in which the first aspect of the present invention is reflected includes an auto-focusing driving part including: an auto-focusing coil part to be disposed at a periphery of a lens part; an auto-focusing magnet part to be disposed to be radially spaced apart from the auto-focusing coil part; and an auto-focusing supporting member configured to support, with respect to an autofocus fixing part including the auto-focusing magnet part, an autofocus movable part including the auto-focusing coil part, the autofocus movable part being supported to be movable in an optical-axis direction, the auto-focusing driving part being configured to perform automatic focusing by utilizing a driving force of a voice coil motor composed of the auto-focusing coil part and the auto-focusing magnet part, and the lens driving device also includes a shake-correcting driving part including: a shake-correcting magnet part to be disposed in the auto-focusing driving part; a shake-correcting coil part to be disposed to be spaced apart from the shake-correcting magnet part in the optical-axis direction; and a shake-correcting supporting member configured to support, with respect to a shake-correcting fixing part including the shake-correcting coil part, a shake-correcting movable part including the shake-correcting magnet part, the shake-correcting movable part being supported to be able to sway in an optical-axis-orthogonal plane, the shake-correcting driving part being configured to perform shake correction by utilizing a driving force of an another voice coil motor composed of the shake-correcting coil part and the shake-correcting magnet part. The shake-correcting supporting member is composed of a pair of power-supplying suspension wires and a pair of signal suspension wires, the shake-correcting supporting member connecting the shake-correcting fixing part to the autofocus fixing part. The autofocus movable part includes a position-detecting magnet. The autofocus fixing part includes a pair of auto-focusing power-source lines to be connected to the pair of power-supplying suspension wires, a pair of signal lines to be connected to the pair of signal suspension wires, an auto-focusing control part to be electrically connected to the pair of power-supplying suspension wires and the pair of signal suspension wires via the pair of auto-focusing power-source lines and the pair of signal lines, and a coil power-supply line configured to electrically connect the auto-focusing control part to the auto-focusing coil part. The auto-focusing control part includes: a Hall element to be disposed to face the position-detecting magnet, the Hall element being configured to detect a position of the auto-focus movable part in the optical-axis direction based on a change in magnetic field; a coil control part configured to control an energization current through the auto-focusing coil part based on a control signal to be provided via the pair of signal suspension wires and based on a detection result of the Hall element; and an auto-focusing circuit board on which the Hall element and the coil control part are to be mounted.

A camera module in which the second aspect of the present invention is reflected includes: the aforementioned lens driving device; a lens part to be mounted on the autofocus movable part; and an image capturing part configured to capture a subject image imaged by the lens part.

A camera-mounted device in which the third aspect of the present invention is reflected is an information device or a transporting device, and includes: the aforementioned camera module; and a control part configured to process image information obtained by the camera module.

Advantageous Effects of Invention

According to the present invention, it is possible to simplify the configuration of an OIS supporting member used for driving of an AF coil part and a position detecting part, and it is also possible to improve the reliability of an AF driving part.

DESCRIPTION OF EMBODIMENTS

Hereinafter, embodiments of the present invention will be described in detail with reference to the drawings.

Figure 1A:
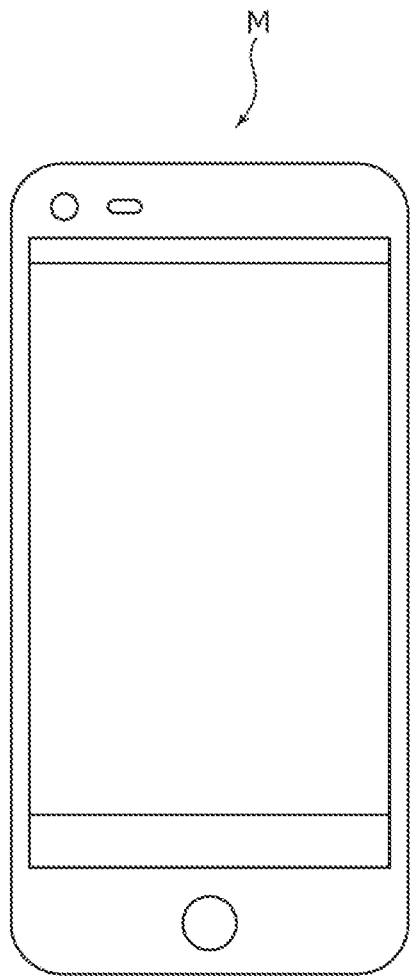
FIGS. 1A and 1B illustrate a smartphone in which a camera module according to an embodiment of the present invention is mounted.
Figure 1B:
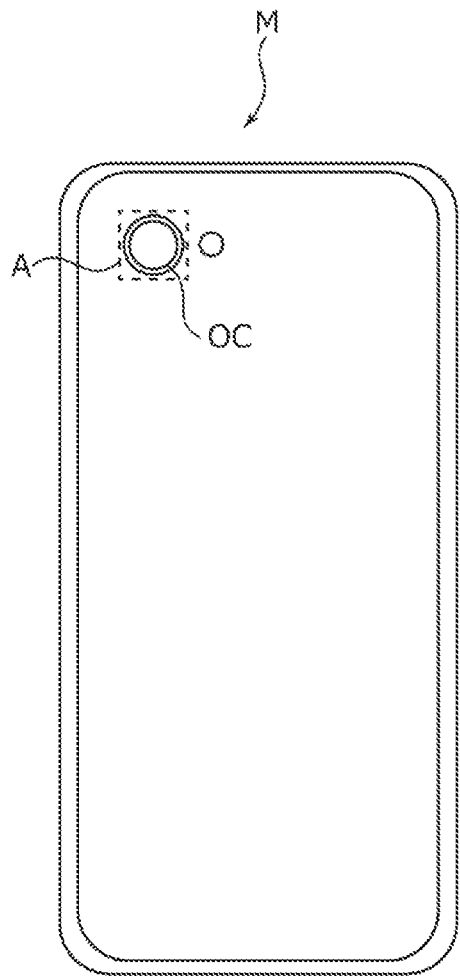

FIGS. 1A and 1B illustrate smartphone M (camera-mounted device) in which camera module A according to an embodiment of the present invention is mounted. FIG. 1A is a front view of smartphone M and FIG. 1B is a rear view of smartphone M.

Smartphone M is provided with camera module A, for example, as back side camera OC. Camera module A has an AF function and an OIS function, and can capture an image without image blurring by automatically performing focusing at the time of capturing a subject and by optically correcting shake (vibration) caused at the time of capturing the image.

Figure 2:
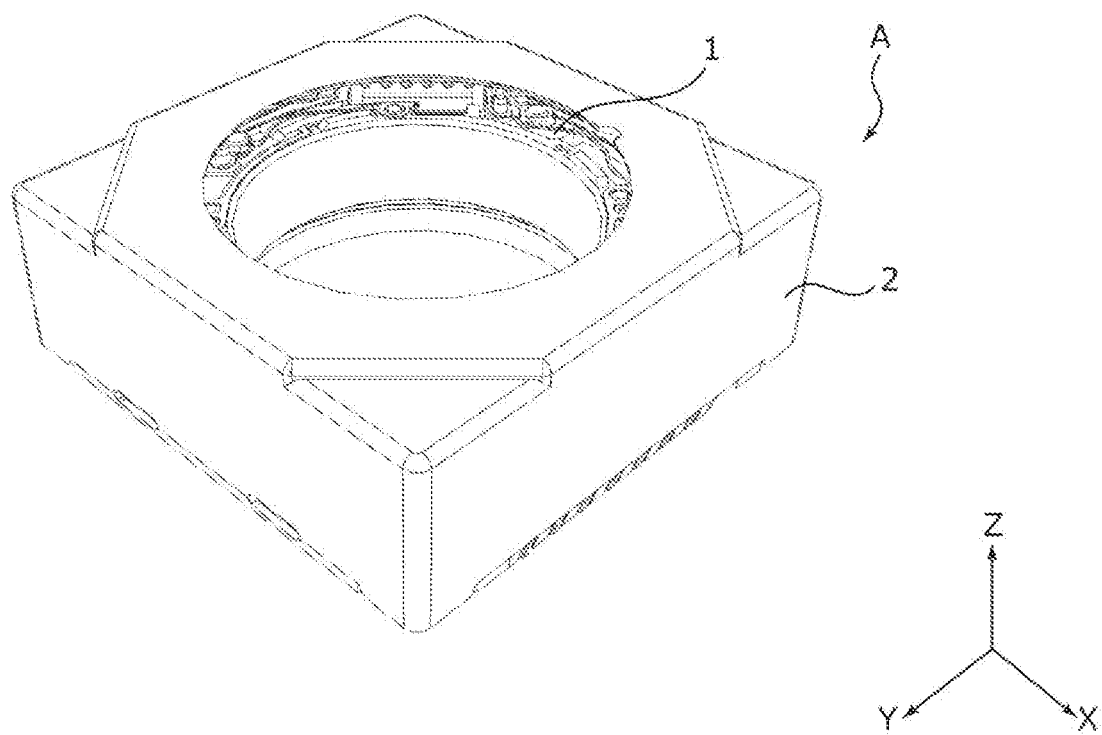
FIG. 2 is a perspective view of an external appearance of the camera module.
Figure 3:
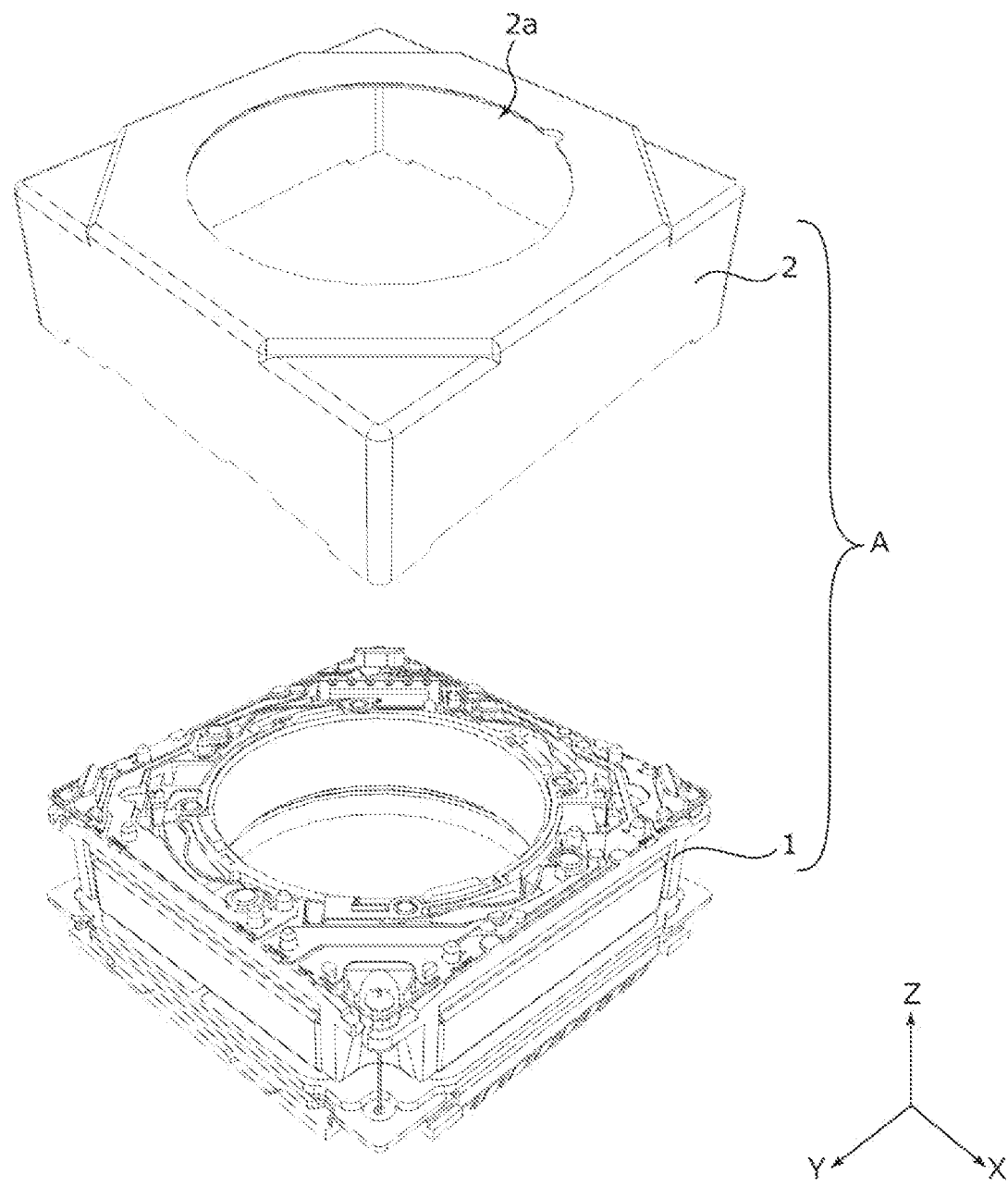
FIG. 3 is an exploded perspective view of the camera module.
Figure 4:
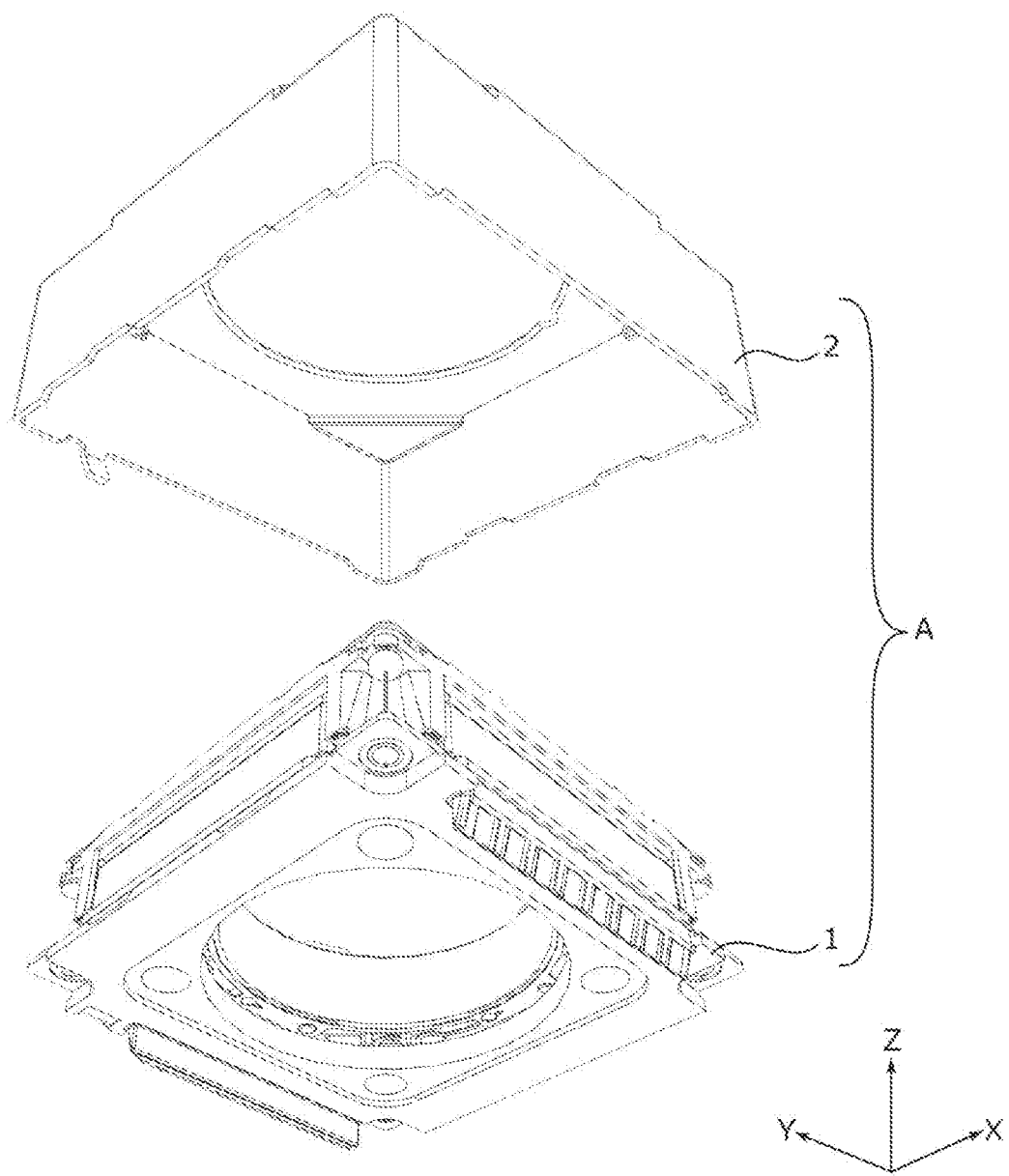
FIG. 4 is an exploded perspective view of the camera module.

FIG. 2 is a perspective view of an external appearance of camera module A. FIGS. 3 and 4 are exploded perspective views of camera module A. FIG. 3 is an upper perspective view and FIG. 4 is a lower perspective view. The embodiments will be described using an orthogonal coordinate system (X, Y, Z) as illustrated in FIGS. 2 to 4. The same orthogonal coordinate system (X, Y, Z) is also used for illustration of below-mentioned figures. Camera module A is mounted such that the vertical direction (or horizontal direction) is the X-direction, the horizontal direction (or vertical direction) is the Y-direction, and the front-rear direction is the Z-direction during actually capturing an image with smartphone M. That is, the Z-direction is the optical axis direction, the upper side in the figures is the light reception side in the optical axis direction (also referred to as "macro position side"), and the lower side is the image formation side in the optical axis direction (also referred to as "infinity position side"). In addition, the X- and Y-directions orthogonal to the Z-axis are referred to as "optical-axis-orthogonal directions."

Camera module A includes lens driving device 1 that achieves the AF function and the OIS function, a lens part (not illustrated) composed of a cylindrical lens barrel and a lens housed therein, an image capturing part (not illustrated) configured to capture a subject image imaged by the lens part, cover 2 entirely covering camera module A, and the like.

Cover 2 is a capped rectangular cylindrical member having a square shape in plan view as seen in the optical-axis direction, and has circular opening 2a in its top surface. The lens part (not illustrated) faces outside from this opening 2a. Cover 2 is fixed to base 21 (see FIGS. 13 and 14) of OIS fixing part 20 of lens driving device 1.

The image capturing part (not illustrated) includes an imaging device (not illustrated), and is disposed on the image formation side of lens driving device 1 in the optical-axis direction. The imaging device (not illustrated) is composed of, for example, a CCD (charge-coupled device) image sensor, a CMOS (complementary metal oxide semiconductor) image sensor, or the like. The imaging device (not illustrated) captures a subject image imaged by the lens part (not illustrated).

Figure 5:
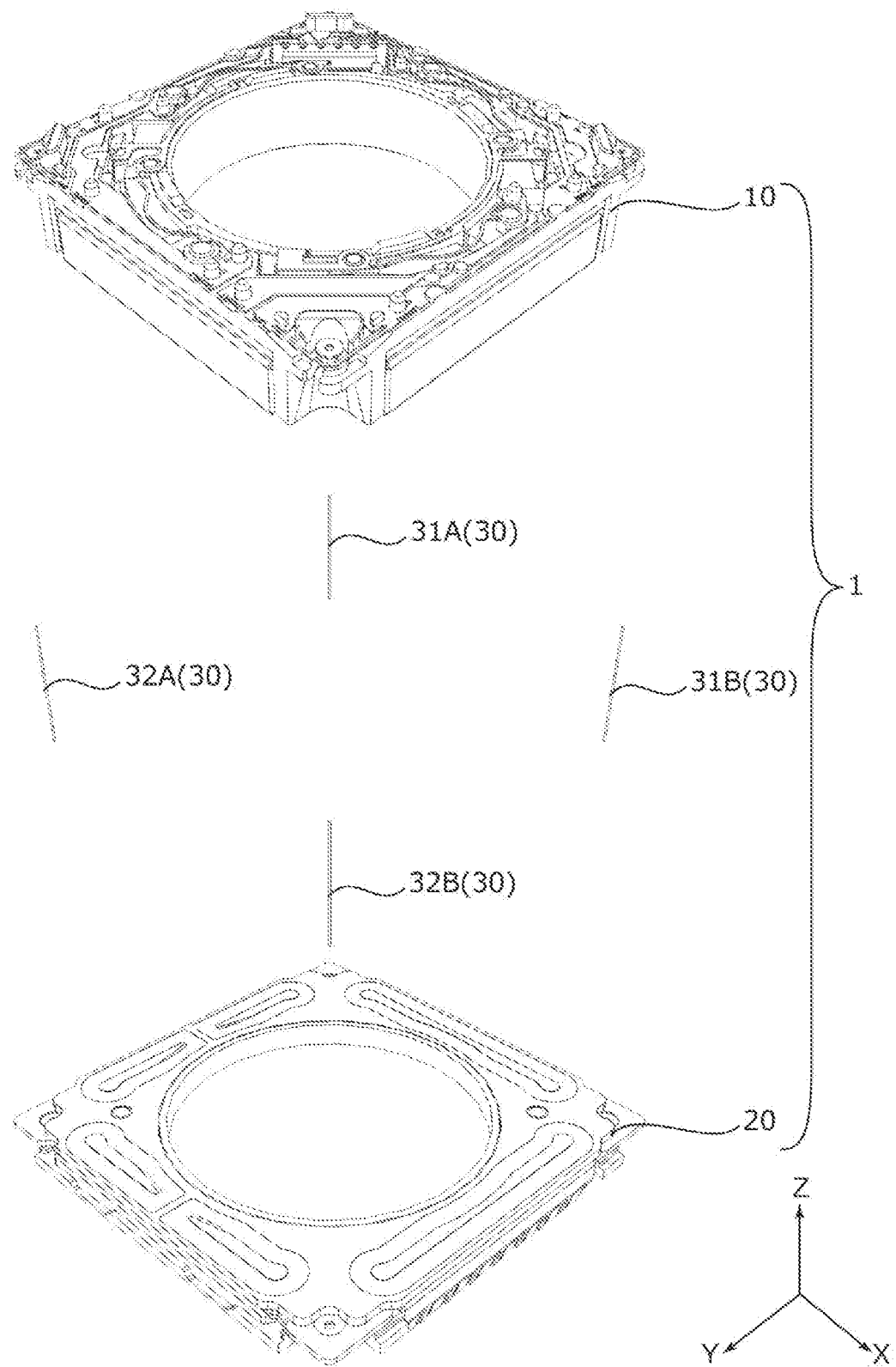
FIG. 5 is an exploded perspective view of a lens driving device.
Figure 6:
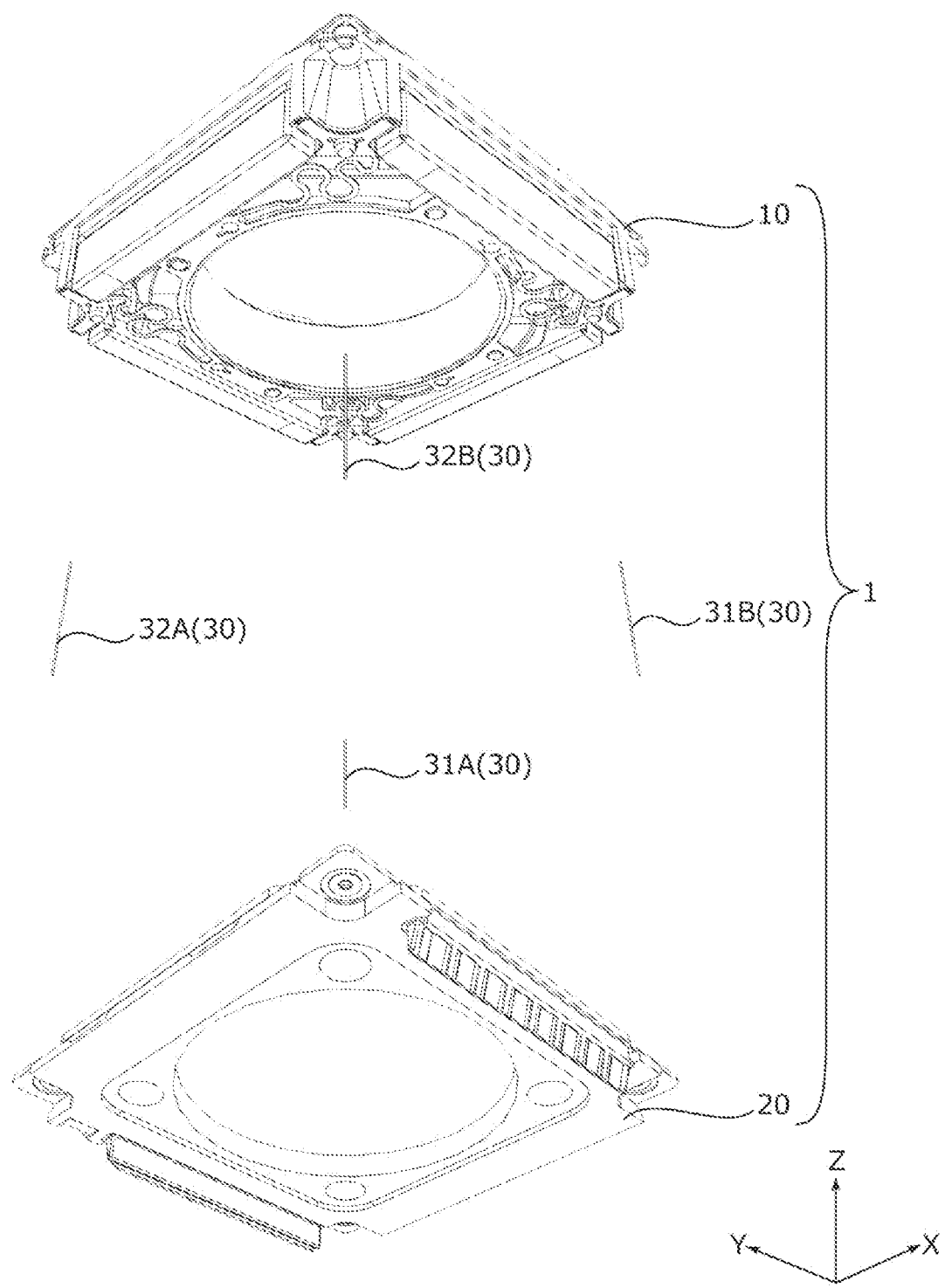
FIG. 6 is an exploded perspective view of the lens driving device.

FIGS. 5 and 6 are exploded perspective views of lens driving device 1. FIG. 5 is an upper perspective view and FIG. 6 is a lower perspective view. As illustrated in FIGS. 5 and 6, lens driving device 1 includes OIS movable part 10, OIS fixing part 20, OIS supporting member 30, and the like.

OIS movable part 10 includes an OIS magnet part being a component of an OIS voice coil motor, and sways in the XY plane during shake correction. OIS fixing part 20 includes an OIS coil part being a component of the OIS voice coil motor, and supports OIS movable part 10 via OIS supporting member 30. That is, the moving-magnet system is employed in the OIS driving part of lens driving device 1. OIS movable part 10 includes an AF driving part (AF movable part 11 and AF fixing part 12 (see FIGS. 7 and 8)).

OIS movable part 10 is disposed to be spaced apart from OIS fixing part 20 on the light reception side in the optical-axis direction, and is coupled to OIS fixing part 20 by OIS supporting member 30. Specifically, OIS supporting member 30 is composed of four suspension wires (hereinafter referred to as "suspension wires 30") extending in the Z-direction. One ends (upper ends) of suspension wires 30 are fixed to OIS movable part 10 (to upper elastic supporting member 13 (see FIGS. 7 and 8)), and the other ends (lower ends) are fixed to OIS fixing part 20 (to coil board 23 (see FIGS. 13 and 14)). OIS movable part 10 is supported to be able to sway in the XY plane by suspension wires 30.

In the embodiments of the present invention, suspension wires 31A and 31B among four suspension wires 30 are used as a signal path for conveying control signals to control IC 161 (see FIG. 11), and suspension wires 32A and 32B among four suspension wires 30 are used as a power-supplying path to control IC 161 (suspension wires 31A and 31B may also hereinafter be referred to as "signal suspension wires 31A and 31B" and suspension wires 32A and 32B may also hereinafter be referred to as "power-supplying suspension wires 32A and 32B").

Figure 7:
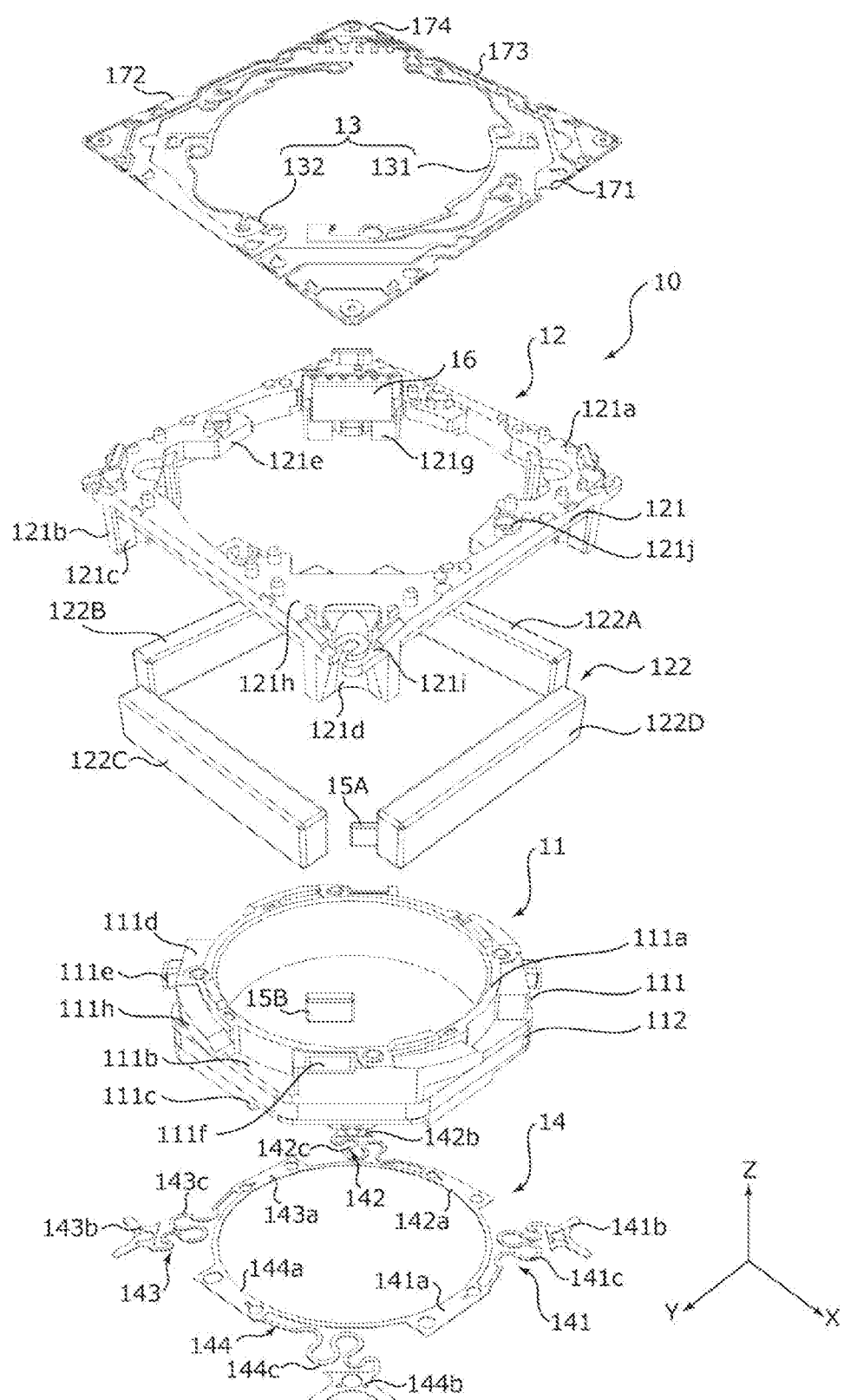
FIG. 7 is an exploded perspective view of an OIS movable part.
Figure 8:
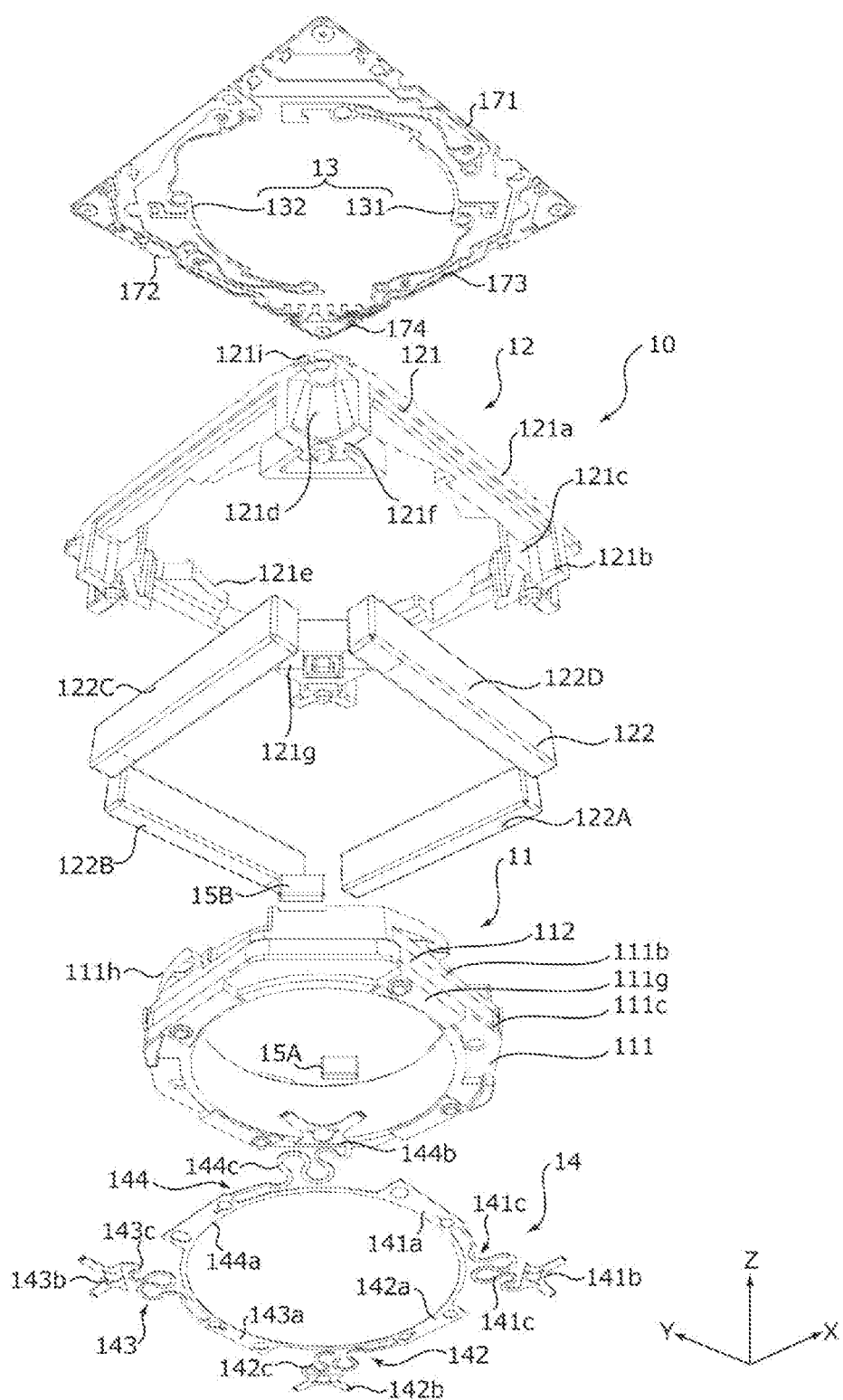
FIG. 8 is an exploded perspective view of the OIS movable part.

FIGS. 7 and 8 are exploded perspective views of OIS movable part 10. FIG. 7 is an upper perspective view and FIG. 8 is a lower perspective view. As illustrated in FIGS. 7 and 8, OIS movable part 10 includes AF movable part 11, AF fixing part 12, AF supporting members 13 and 14, AF power-supply lines 171, signal lines 172 and 174, and the like.

AF movable part 11 includes AF coil part 112 being a component of the AF voice coil motor, and moves in the optical-axis direction during focusing. AF fixing part 12 includes magnet part 122 (AF magnet part), and supports AF movable part 11 via AF supporting members 13 and 14. That is, the moving-coil system is employed in the AF driving part of lens driving device 1.

AF movable part 11 is disposed to be radially inwardly spaced apart from AF fixing part 12, and is coupled to AF fixing part 12 by AF supporting members 13 and 14. AF supporting member 13 is an upper elastic supporting member which supports AF movable part 11 with respect to AF fixing part 12 at the upper side (AF supporting member 13 may also hereinafter be referred to as "upper elastic supporting member 13"), and AF supporting member 14 is a lower elastic supporting member which supports AF movable part 11 with respect to AF fixing part 12 at the lower side (AF supporting member 14 may also hereinafter be referred to as "lower elastic supporting member 14").

AF movable part 11 includes lens holder 111, AF coil part 112, and position-detecting magnets 15A and 15B.

Lens holder 111 includes cylindrical lens housing 111a and flange portions 111b and 111c. Flange portions 111b and 111c protrude radially outward from lens housing 111a and each have a substantially octagonal shape in plan view. AF coil part 112 is wound on a portion sandwiched between flange portions 111b and 111c (this portion may also hereinafter be referred to as "coil winding portion"). The upper surface of flange portion 111b serves as a locking portion for restricting the movement of AF movable part 11 toward the light reception side in the optical-axis direction.

Figure 9A:
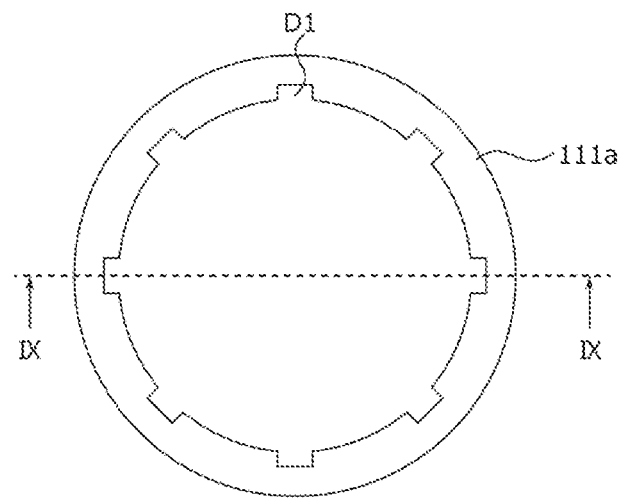
FIGS. 9A and 9B illustrate an example of grooves disposed in a lens housing.
Figure 9B:
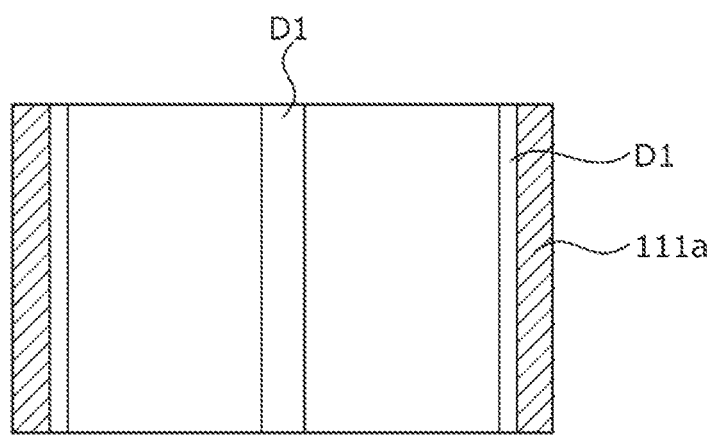
Figure 10A:
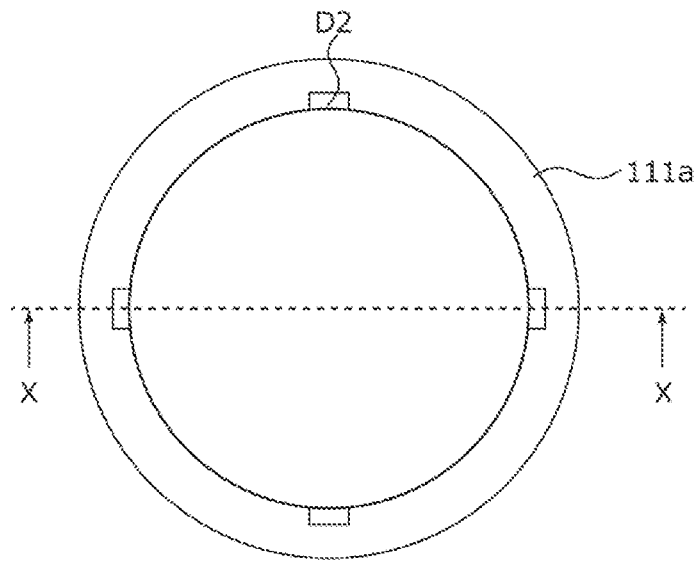
FIGS. 10A and 10B illustrate another example of grooves disposed in the lens housing.
Figure 10B:
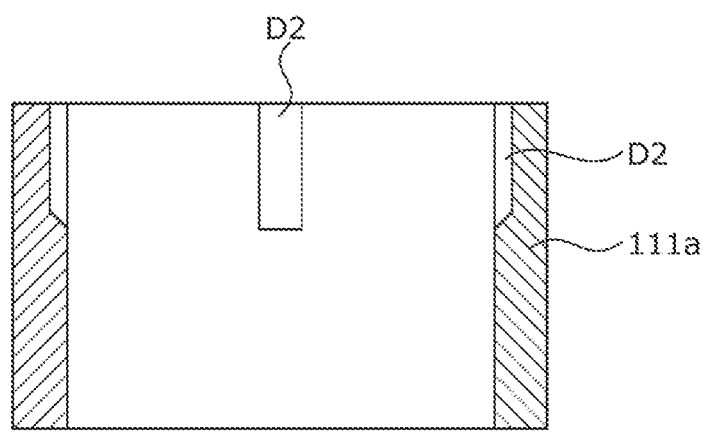

It is preferable that the inner peripheral surface of lens housing 111a include grooves to which an adhesive is applied. FIGS. 9A, 9B, 10A, and 10B illustrate examples of the grooves disposed in the inner peripheral surface of lens housing 111a. FIG. 9A illustrates lens-holder housing 111a as seen from above, and FIG. 9B is a sectional view taken along line IX-IX and seen in the direction indicated by the arrows in FIG. 9B. FIG. 10A illustrates lens-holder housing 111a as seen from above, and FIG. 10B is a sectional view taken along line X-X and seen in the direction indicated by the arrows in FIG. 10B.

In FIGS. 9A and 9B, grooves D1 extending along the optical-axis direction are formed in the inner peripheral surface of lens housing 111a at eight circumferentially equidistant positions. Grooves D1 extend through from the upper portion to the lower portion of lens-holder housing 111a. In FIGS. 10A and 10B, grooves D2 extending along the optical-axis direction are formed in the inner peripheral surface of lens housing 111a at four circumferentially equidistant positions. Grooves D2 are formed only in the upper portion of lens-holder housing 111a. The grooves may be of any shape which allows an applied adhesive to be held in the grooves, and are not limited to the examples illustrated in FIGS. 9A, 9B, 10A, and 10B.

OIS movable part 10 is supported by suspension wires 30. Accordingly, a method of mounting the lens part (not illustrated) to lens housing 111a by screwing is not preferable since there is a risk that suspension wires 30 may be damaged. In the embodiments of the present invention, the lens part (not illustrated) is adhesively fixed to the inner peripheral surface of lens housing 111a, so that there is no risk that suspension wires 30 may be damaged. Additionally, the grooves in the inner peripheral surface of lens housing 111a each hold therein a proper amount of adhesive, so that the adhesive strength between lens holder 111 and the lens part is enhanced.

Lens holder 111 includes four upper-spring fixing portions 111d used for fixing upper elastic supporting member 13 at four portions of the upper outer periphery of lens housing 111a where lens housing 111a crosses the directions obtained by rotating the X- and Y-directions (hereinafter referred to as "cross directions") 45 degrees (the directions obtained by rotation may hereinafter be referred to as "diagonal directions"). Lens holder 111 includes first stopper portions 111h along the outer periphery of lens housing 111a. The undersurfaces of first stopper portions 111h serve as locking portions for restricting the movement of AF movable part 11 toward the image formation side in the optical-axis direction.

Lens holder 111 includes tying parts 111e radially outwardly protruding from two diagonally-positioned upper-spring fixing portions 111d of four upper-spring fixing portions 111d. Lens holder 111 includes magnet housings 111f adapted to house position-detecting magnets 15A and 15B in the other two of upper-spring fixing portions 111d to which tying parts 111e are not disposed. Lens holder 111 also includes lower-spring fixing portions 111g for fixing lower elastic supporting member 14 at four portions of the undersurface of flange portion 111c where flange portion 111c crosses the cross directions.

AF coil part 112 is an air core coil to be energized at the time of focusing, and is wound on the outer peripheral surface of coil winding portion of lens holder 111. The both ends of AF coil part 112 are tied to tying parts 111e of lens holder 111. The energization current through AF coil part 112 is controlled by control IC 161 (see FIG. 11).

Position-detecting magnets 15A and 15B are disposed in magnet housings 111f of lens holder 111. Position-detecting magnet 15A (hereinafter referred to as "first position-detecting magnet 15A") disposed on the side corresponding to an AF control part is actually used for position detection of AF movable part 11. The other position-detecting magnet 15B (hereinafter referred to as "second position-detecting magnet 15B") is a dummy magnet which is not used for position detection of AF movable part 11. Second position-detecting magnet 15B is disposed in order to balance the magnetic forces which act on AF movable part 11 and to stabilize the attitude of AF movable part 11. In other words, if second position-detecting magnet 15B is not disposed, an unbalanced magnetic force caused by the magnetic field generated by magnet part 122 acts on AF movable part 11, so as to make the attitude of AF movable part 11 unstable; in order to prevent this, second position-detecting magnet 15B is disposed.

AF fixing part 12 includes magnet holder 121, magnet part 122, and AF control part 16.

Magnet holder 121 includes square upper frame 121a and legs 121b. Legs 121b are vertically provided at the four corners of upper frame 121a. Four legs 121b include magnet holding portions 121c, respectively. Magnet holding portions 121c hold magnet part 122 along the four sides of upper frame 121a. Legs 121b also includes wire insertion portions 121d, respectively. Wire insertion portions 121d are each depressed radially inward into the shape of a circular arc. Suspension wires 30 are disposed in wire insertion portions 121d (see FIGS. 5 and 6). Interference between suspension wires 30 and magnet holder 121 during sway of OIS movable part 10 can be avoided by providing wire insertion portions 121d.

Magnet holder 121 includes at its upper portions second stopper portions 121e projecting radially inward from magnet holder 121. Magnet holder 121 includes an opening formed by cutting out portions corresponding to lens housing 111a, upper-spring fixing portions 111d, tying parts 111e, and first stopper portions 111h of lens holder 111. AF movable part 11 can move on the light reception side in the optical-axis direction beyond the upper surface of magnet holder 121. When AF movable part 11 moves toward the light reception side in the optical-axis direction, second stopper portions 121e come into contact with flange portion 111b of lens holder 111, so as to restrict the movement of AF movable part 11 toward the light reception side in the optical-axis direction.

Additionally, arm portions 131c, 131f, 132c, and 132f (see FIG. 12) of upper elastic supporting member 13 are placed on the upper surfaces of second stopper portions 121e. Damper housings 121j are disposed at second stopper portion 121e.

Magnet holder 121 includes, at the undersurfaces of legs 121b, lower-spring fixing portions 121f for fixing lower elastic supporting member 14. Magnet holder 121 includes, at the four corners of its upper portion, upper-spring fixing portions 121h for fixing upper elastic supporting member 13.

Corner portions 121i of upper-spring fixing portions 121f are each formed to be downwardly depressed further below the upper surface of magnet holder 121 (the surface to which upper elastic supporting member 13 is attached) and are each formed such that a gap is formed between the corner portion and upper elastic supporting member 13 after attachment of upper elastic supporting member 13 (corner portions 121i may be referred to as "damper disposing portions 121i"). The apical-angle portions of damper disposing portions 121i extend outward and are circularly cut. Those portions of damper disposing portions 121i which are circularly cut communicate with wire insertion portions 121d.

Magnet holder 121 also includes IC housing 121g for housing AF control part 16 in one of legs 121b.

Magnet part 122 includes four cuboid permanent magnets 122A to 122D. Permanent magnets 122A to 122D are adhesively fixed to magnet holding portions 121c of magnet holder 121. Permanent magnets 122A to 122D are each magnetized such that a magnetic field radially traversing AF coil part 112 is formed at AF coil part 112. For example, permanent magnets 122A to 122D are magnetized such that the inner periphery sides and the outer periphery sides of permanent magnets 122A to 122D are set to N pole and S pole, respectively.

Magnet part 122 and coil part 112 constitute the AF voice coil motor. In the embodiments of the present invention, magnet part 122 serves as both of the AF magnet part and the OIS magnet part.

Figure 11:
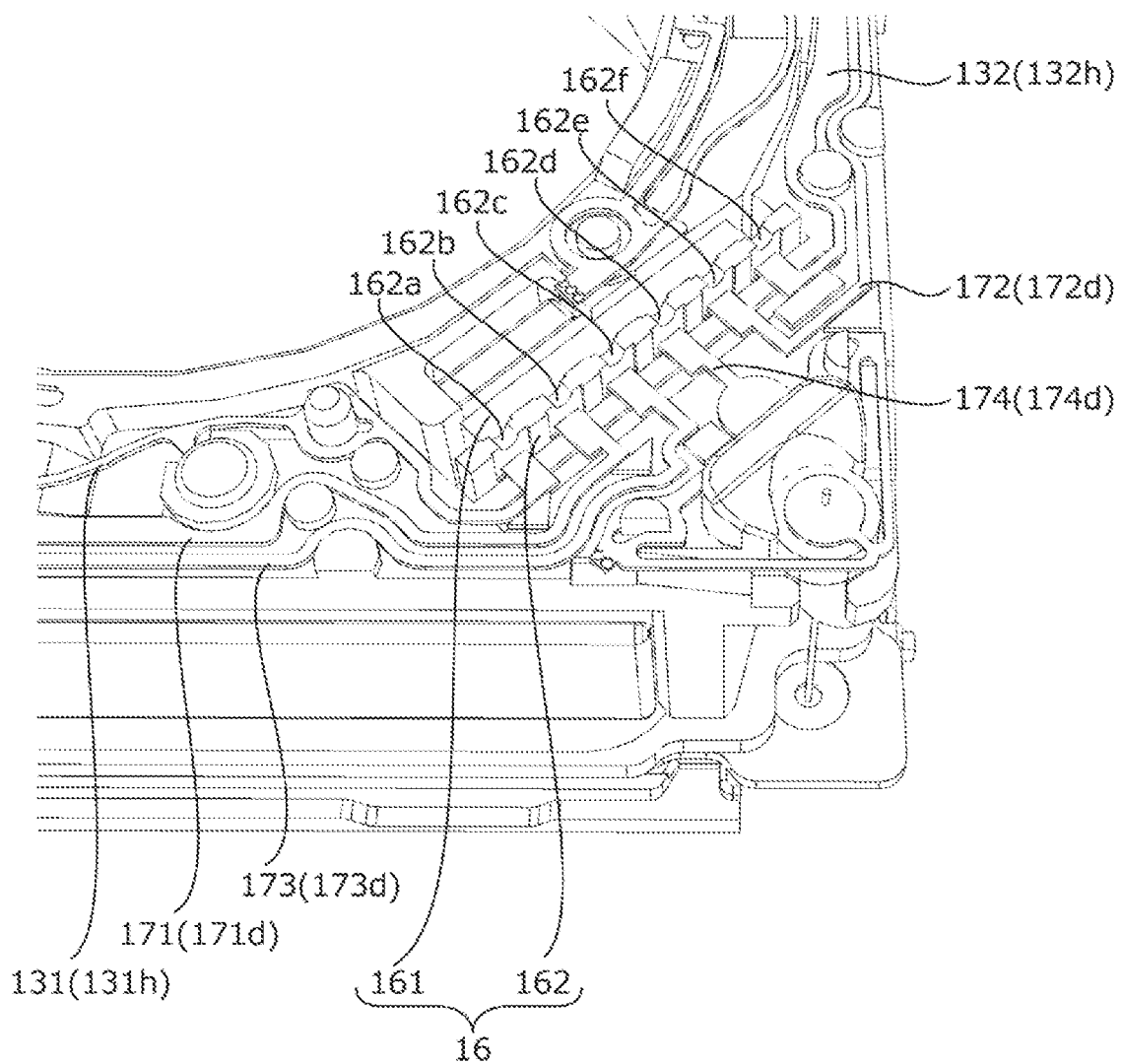
FIG. 11 is an enlarged view illustrating a configuration of an AF control part.

AF control part 16 is disposed in IC housing 121g of magnet holder 121. FIG. 11 is an enlarged view illustrating the configuration of AF control part 16. AF control part 16 includes control IC 161, AF circuit board 162 on which control IC 161 is mounted, and a capacitor (whose reference numeral is omitted). Control IC 161 includes built-in Hall element (not illustrated) that utilizes the Hall effect to detect the change in magnetic field, and functions as a Z-position detecting part. Control IC 161 is disposed so that the detecting direction of the Hall element (not illustrated) is the same as the optical-axis direction. Control IC 161 mainly detects the change in magnetic field produced by first position-detecting magnet 15A. In this way, the position of AF movable part 11 in the optical-axis direction is detected.

Control IC 161 also includes a coil control part (not illustrated) that controls the energization current through AF coil part 112. Control IC 161 is electrically connected to AF coil part 112, and controls the energization current through AF coil part 112 based on the control signals provided via signal suspension wires 31A and 31B and signal lines 173 and 174 and based on the detection result of the Hall element.

AF circuit board 162 includes power-supply output terminals 162a and 162f, power-supply input terminals 162b and 162e, and signal input terminals 162c and 162d. Power-supply output terminals 162a and 162f are connected to upper elastic supporting member 13 (upper plate springs 131 and 132), power-supply input terminals 162b and 162e are connected to AF power-supply lines 171 and 172, and signal input terminals 162c and 162d are connected to signal lines 173 and 174.

Figure 12A:
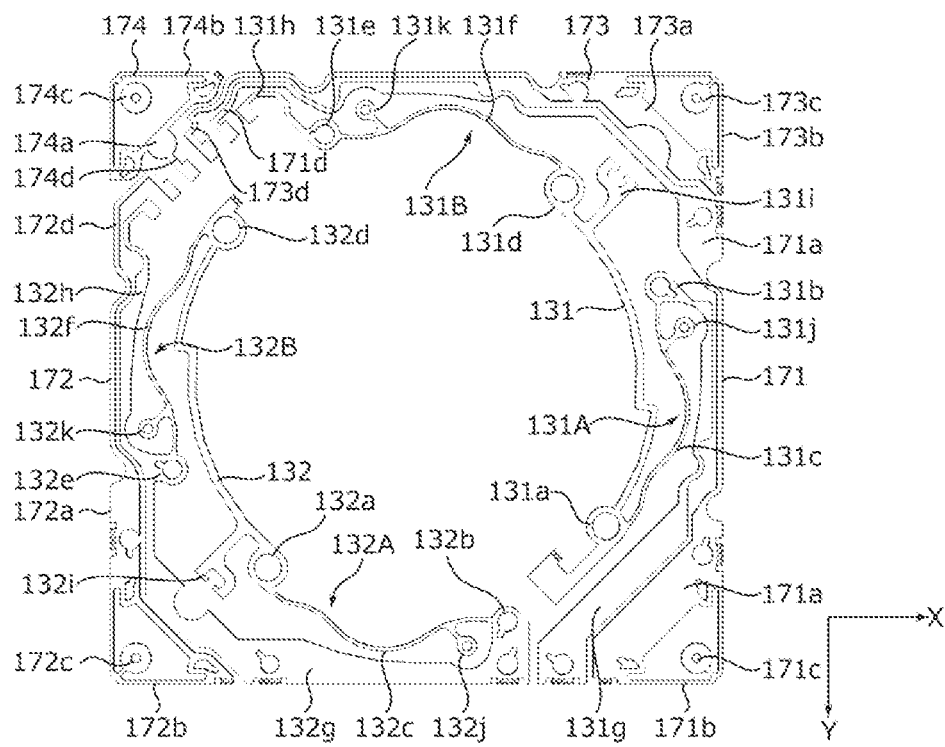
FIGS. 12A and 12B are plan views illustrating a configuration of an upper elastic supporting member, AF power-supply lines, and signal lines.
Figure 12B:
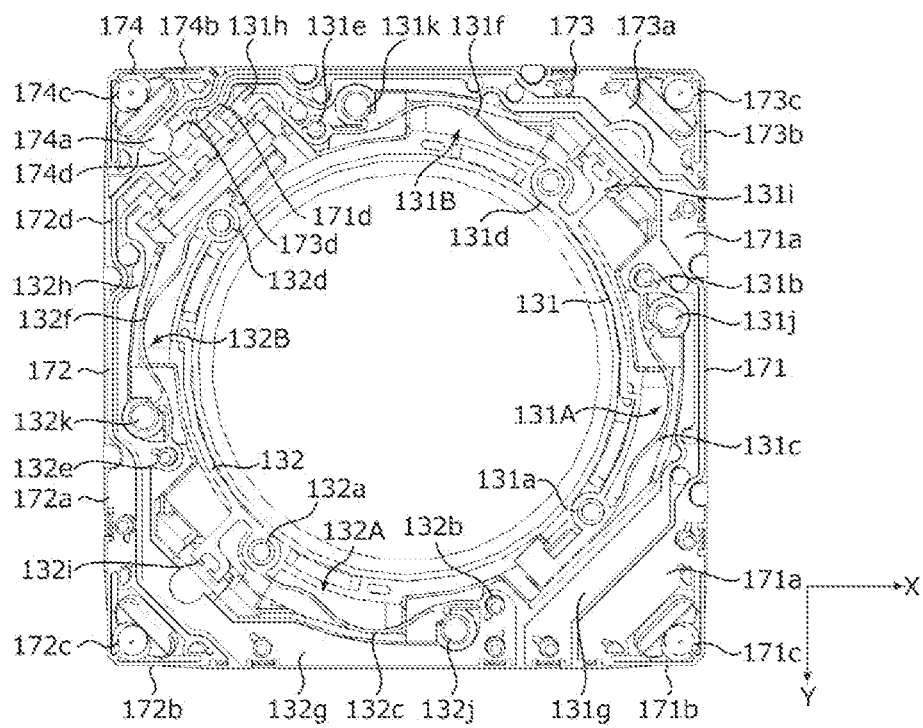

Upper elastic supporting member 13, AF power-supply lines 171 and 172, and signal lines 173 and 174 are formed, for example, from beryllium copper, nickel copper, stainless steel, and/or the like. FIGS. 12A and 12B are plan views illustrating the configuration of upper elastic supporting member 13, AF power-supply lines 171 and 172, signal lines 173 and 174. FIG. 12A illustrates the state before upper elastic supporting member 13, AF power-supply lines 171 and 172, and signal lines 173 and 174 are attached to AF movable part 11 and AF fixing part 12, and FIG. 12B illustrates the state after upper elastic supporting member 13, AF power-supply lines 171 and 172, and signal lines 173 and 174 are attached to AF movable part 11 and AF fixing part 12.

As illustrated in FIGS. 12A and 12B, upper elastic supporting member 13, AF power-supply lines 171 and 172, and signal lines 173 and 174, as a whole, are square in plan view, that is, have a shape similar to the shape of upper frame 121a of magnet holder 121. Upper elastic supporting member 13, AF power-supply lines 171 and 172, and signal lines 173 and 174 are routed on or above upper frame 121a in such a manner as not to be in contact with one another. Upper elastic supporting member 13 is disposed inside AF power-supply lines 171 and 172 and signal lines 173 and 174 for coupling magnet holder 121 and lens holder 111 together. Upper plate springs 131 and 132 and AF power-supply lines 171 and 172, and signal lines 173 and 174 are formed by etching one sheet metal, for example.

Upper elastic supporting member 13 includes upper plate springs 131 and 132 adapted to elastically support AF movable part 11 with respect to AF fixing part 12. Upper plate springs 131 and 132 function as coil power-supply lines for supplying electricity to AF coil part 112. AF power-supply lines 171 and 172 are connected to power-supplying suspension wires 32B and 32A, and supply electricity to AF control part 16 (control IC 161). Signal lines 173 and 174 are connected to signal suspension wires 31B and 31A, and provide the control signals to AF control part 16 (control IC 161).

Upper plate spring 131 includes two spring portions 131A and 131B. Spring portion 131A includes lens-holder fixing portion 131a to be fixed to lens holder 111, magnet-holder fixing portion 131b to be fixed to magnet holder 121, and arm portion 131c coupling lens-holder fixing portion 131a and magnet-holder fixing portion 131b together. Similarly, spring portion 131B includes lens-holder fixing portion 131d, magnet-holder fixing portion 131e, and arm portion 131f. Lens-holder fixing portions 131a and 131d are coupled to each other along lens housing 111a of lens holder 111.

Upper plate spring 131 is positioned with respect to lens holder 111 and fixed thereto by fitting positioning bosses (whose reference numerals are omitted) of upper-spring fixing portions 111d of lens holder 111 in fixing holes (whose reference numerals are omitted) of lens-holder fixing portions 131a and 131d. Upper plate spring 131 is also positioned with respect to magnet holder 121 and fixed thereto by fitting positioning bosses (whose reference numerals are omitted) of upper-spring fixing portions 121e of magnet holder 121 in fixing holes (whose reference numerals are omitted) of magnet-holder fixing portions 131b and 131e.

Arm portions 131c and 131f each have a curved shape, and elastically deform when AF movable part 11 moves. Upper plate spring 131 includes damper fixing portions 131j and 131k diverging and extending from arm portions 131c and 131f, respectively. Damper fixing portions 131j and 131k are to be disposed in damper housings 121j of magnet holder 121, and are to be embedded therein by the damper material.

Upper plate spring 131 includes supplementary fixing portion 131g extending from magnet-holder fixing portion 131b toward one of the peripheral edges extending along the X-direction. Supplementary fixing portion 131g is disposed to the upper surface of magnet holder 121, and reinforces the fixation state of upper plate spring 131 to magnet holder 121.

Upper plate spring 131 includes terminal connection portion 131h extending from magnet-holder fixing portion 131e toward AF circuit board 162. Terminal connection portion 131h is connected to power-supply output terminal 162a of AF control part 16. Upper plate spring 131 includes coil connection portion 131i diverging and extending from the coupling portion of lens-holder fixing portions 131a and 131d. The end of coil connection portion 131i is U-shaped. Coil connection portion 131i is connected to one end of AF coil part 112 by soldering. That is, AF control part 16 and AF coil part 112 are electrically connected to each other via upper plate spring 131.

Upper plate spring 132 has the same basic structure as upper plate spring 131. That is, upper plate spring 132 includes two spring portions 132A and 132B. Spring portions 132A and 132B include lens-holder fixing portions 132a and 132d, magnet-holder fixing portions 132b and 132e, and arm portions 132c and 132f. Lens-holder fixing portions 132a and 132d are coupled to each other along lens housing 111a of lens holder 111.

Upper plate spring 132 is positioned with respect to lens holder 111 and fixed thereto by fitting positioning bosses (whose reference numerals are omitted) of upper-spring fixing portions 111d of lens holder 111 in fixing holes (whose reference numerals are omitted) of lens-holder fixing portions 132a and 132d. Upper plate spring 132 is also positioned with respect to magnet holder 121 and fixed thereto by fitting positioning bosses (whose reference numerals are omitted) of upper-spring fixing portions 121e of magnet holder 121 in fixing holes (whose reference numerals are omitted) of magnet-holder fixing portions 132b and 132e.

Arm portions 132c and 132f each have a curved shape, and elastically deform when AF movable part 11 moves. Upper plate spring 132 includes damper fixing portions 132j and 132k diverging and extending from arm portions 132c and 132f, respectively. Damper fixing portions 132j and 132k are to be disposed in damper housings 121j of magnet holder 121, and are to be embedded therein by the damper material.

Upper plate spring 132 includes supplementary fixing portion 132g extending from magnet-holder fixing portion 132b toward magnet-holder fixing portion 132e while forming one of the peripheral edges extending along the X-direction. Supplementary fixing portion 132g is disposed to the upper surface of magnet holder 121, and reinforces the fixation state of upper plate spring 132 to magnet holder 121.

Upper plate spring 132 includes terminal connection portion 132h extending from magnet-holder fixing portion 132e toward AF circuit board 162. Terminal connection portion 132h is connected to power-supply output terminal 162f of AF control part 16.

Upper plate spring 132 includes coil connection portion 132i diverging and extending from the coupling portion of lens-holder fixing portions 132a and 132d. The end of coil connection portion 132i is U-shaped. Coil connection portion 132i is connected to the other end of AF coil part 112 by soldering. That is, AF control part 16 and AF coil part 112 are electrically connected to each other via upper plate spring 132.

AF power-supply lines 171 and 172 include magnet-holder fixing portions 171a and 172a, wire connection portions 171c and 172c, and terminal connection portions 171d and 172d.

AF power-supply lines 171 and 172 are positioned with respect to magnet holder 121 and fixed thereto by fitting positioning bosses (whose reference numerals are omitted) of upper-spring fixing portions 121h of magnet holder 121 in fixing holes (whose reference numerals are omitted) of magnet-holder fixing portions 171a and 172a.

Wire connection portions 171c and 172c are connected to power-supplying suspension wires 32A and 32B (see FIGS. 5 and 6). Wire connection portions 171c and 172c are coupled to magnet-holder fixing portion 171a by link portions 171b and 172b. Terminal connection portions 171d and 172d extend from magnet-holder fixing portions 171a and 172a toward AF circuit board 162, and connected to power-supply input terminals 162b and 162e of AF control part 16.

Signal lines 173 and 174 include magnet-holder fixing portions 173a and 174a, wire connection portions 173c and 174c, and terminal connection portions 173d and 174d.

Signal lines 173 and 174 are positioned with respect to magnet holder 121 and fixed thereto by fitting positioning bosses (whose reference numerals are omitted) of upper-spring fixing portions 121h of magnet holder 121 in fixing holes (whose reference numerals are omitted) of magnet-holder fixing portions 173a and 174a.

Wire connection portions 173c and 174c are connected to signal suspension wires 31A and 31B (see FIGS. 5 and 6). Wire connection portions 173c and 174c are coupled to magnet-holder fixing portions 173a and 174a by link portions 173b and 174b. Terminal connection portions 173d and 174d extend from magnet-holder fixing portions 173a and 174a toward AF circuit board 162, and connected to signal input terminals 162c and 162d of AF control part 16.

In AF power-supply lines 171 and 172 and signal lines 173 and 174, link portions 171b, 172b, 173b, and 174b each include two first links (whose reference numeral is omitted) extending from each of magnet-holder fixing portions 171a, 172a, 173a, and 174a toward the corner, and a second link (whose reference numeral is omitted) inwardly bent from the confluent portion of the two first links. Wire connection portions 171c, 172c, 173c, and 174c are disposed at the ends of the second links, respectively. That is, link portions 171b, 172b, 173b, and 174b interposed between magnet-holder fixing portions 171a, 172a, 173a, and 174a and wire connection portions 171c, 172c, 173c, and 174c are multi-articulated while securing the linkage length.

With this configuration, stresses caused in link portions 171b, 172b, 173b, and 174b during shake correction are mitigated, so that the tilt characteristics improve and also the resistance to impact such as drop impact or the like improves.

Damper fixing portions 131j, 131k, 132j, and 132k of upper plate springs 131 and 132 of upper elastic supporting member 13 are disposed in damper housings 121j of magnet holder 121, and are embedded therein by the damper material. Additionally, gaps are formed respectively between wire connection portions 171c, 172c, 173c, and 174c of AF power-supply lines 171 and 172 and signal lines 173 and 174, on the one hand, and damper disposing portions 121i of magnet holder 121, on the other hand, and the damper material is disposed in these gaps to surround suspension wires 30. The damper material is consequently interposed between upper elastic supporting member 13 and magnet holder 121.

By interposing the damper material (not illustrated) between upper elastic supporting member 13 and magnet holder 121, the generation of unwanted resonance (high-order resonant mode) is reduced, so that operational stability can be ensured. The damper material can be easily applied using a dispenser. For example, an ultraviolet-curable silicone gel is applicable as the damper material.

As with upper elastic supporting member 13, lower elastic supporting member 14 is a plate spring formed, for example, from beryllium copper, nickel copper, stainless steel, and/or the like (lower elastic supporting member 14 may hereinafter be referred to as "lower plate spring 14"), and is square as a whole in plan view. Lower plate spring 14 elastically connects AF fixing part 12 (magnet holder 121) to AF movable part 11 (lens holder 111). Lower plate spring 14 is shaped by etching.

Lower plate spring 14 (lower elastic supporting member) includes four spring portions 141 to 144. Spring portion 141 includes: lens-holder fixing portion 141a to be fixed to lens holder 111; magnet-holder fixing portion 141b that is disposed at a position rotated 90 degrees from lens-holder fixing portion 141a and that is to be fixed to magnet holder 121; and arm portion 141c coupling lens-holder fixing portion 141a and magnet-holder fixing portion 141b together. Spring portions 142 to 144 similarly include the same configuration.

As for lens-holder fixing portions 141a to 144a, adjacent lens-holder fixing portions are coupled to one another and lens-holder fixing portions 141a to 144a as a whole have a shape corresponding to lower-spring fixing portion 111g of lens holder 111. Lower plate spring 14 is positioned with respect to lens holder 111 and fixed thereto by fitting positioning bosses (whose reference numerals are omitted) of lower-spring fixing portions 111g of lens holder 111 in fixing holes (whose reference numerals are omitted) of lens-holder fixing portions 141a to 144a.

Magnet-holder fixing portions 141b to 144b have shapes corresponding to lower-spring fixing portions 121f of magnet holder 121, respectively. Lower plate spring 14 is positioned with respect to magnet holder 121 and fixed thereto by fitting positioning bosses of lower-spring fixing portions 121f in fixing holes of magnet-holder fixing portions 141b to 144b.

In OIS movable part 10, AF control part 16 (control IC 161 and AF circuit board 162), upper elastic supporting member 13, AF power-supply lines 171 and 172, and signal lines 173 and 174 are attached to magnet holder 121.

In attachment, terminal connection portions 131h and 132h of upper plate springs 131 and 132 are soldered and electrically connected to power-supply output terminals 162a and 162f of AF circuit board 162. Terminal connection portions 171d and 172d of AF power-supply lines 171 and 172 are soldered and electrically connected to power-supply input terminals 162b and 162e of AF circuit board 162. Terminal connection portions 173d and 174d of signal lines 173 and 174 are soldered and electrically connected to signal input terminals 162c and 162d of AF circuit board 162.

AF coil part 112, position-detecting magnets 15A and 15B, and lower plate spring 14 are attached to lens holder 111. After attachment of AF coil part 112, position-detecting magnets 15A and 15B, and lower plate spring 14, lens holder 111 is fitted in magnet holder 121 from the image formation side in the optical-axis direction. That is, lens holder 111 is disposed inside magnet holder 121 so that AF coil part 112 faces magnet part 122. Then, upper plate springs 131 and 132 are attached to lens holder 111, and lower plate spring 14 is attached to magnet holder 121. In addition, magnet part 122 is attached to magnet holder 121.

At this time, coil connection portion 131$i$ of upper plate spring 131 is soldered and electrically connected to one end of AF coil part 112 tied to one of tying parts 111$e$ of lens holder 111. Similarly, coil connection portion 132$i$ of upper plate spring 132 is soldered and electrically connected to the other end of AF coil part 112 tied to the other one of tying parts 111$e$ of lens holder 111.

Figure 13:
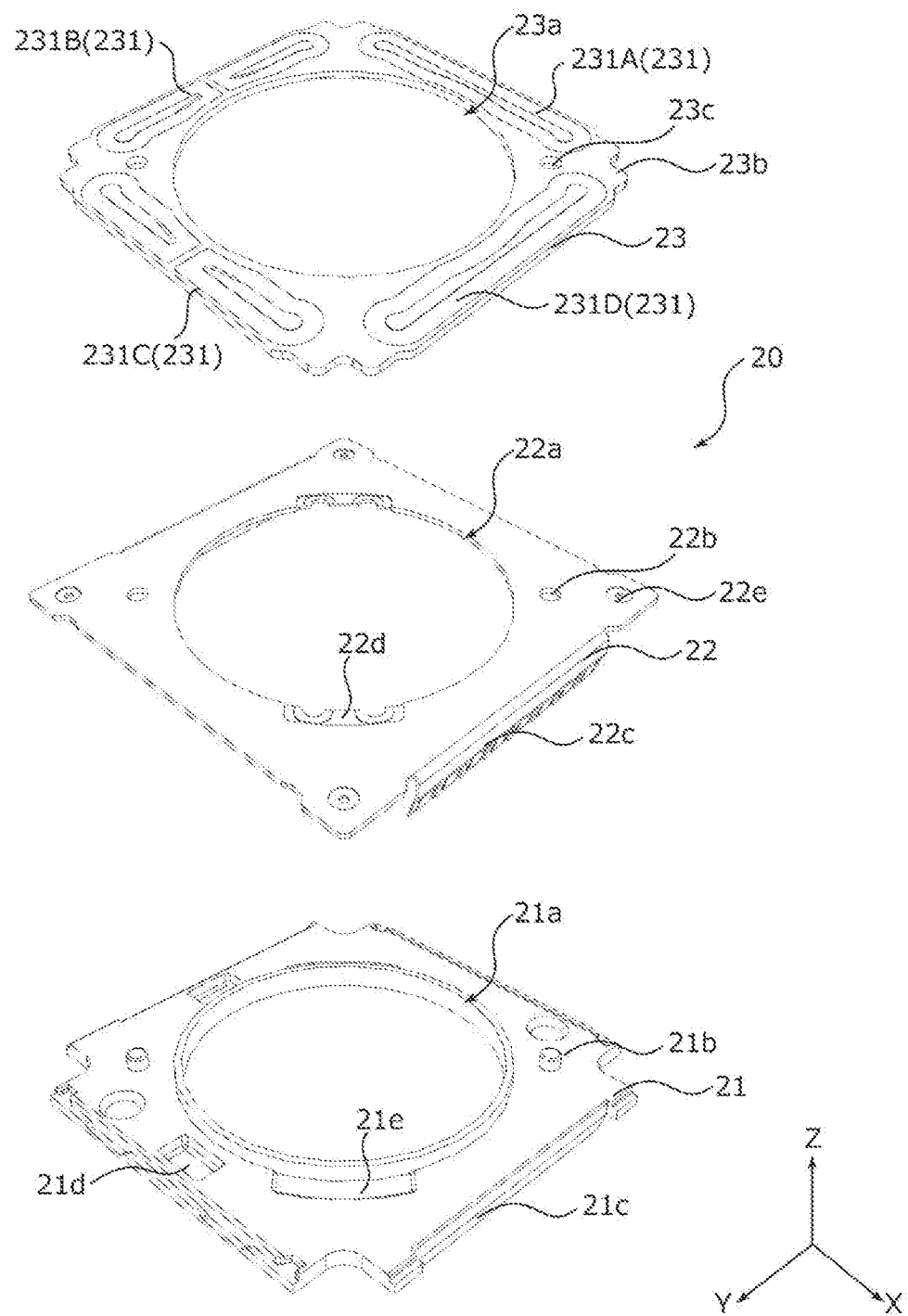
FIG. 13 is an exploded perspective view of an OIS fixing part.
Figure 14:
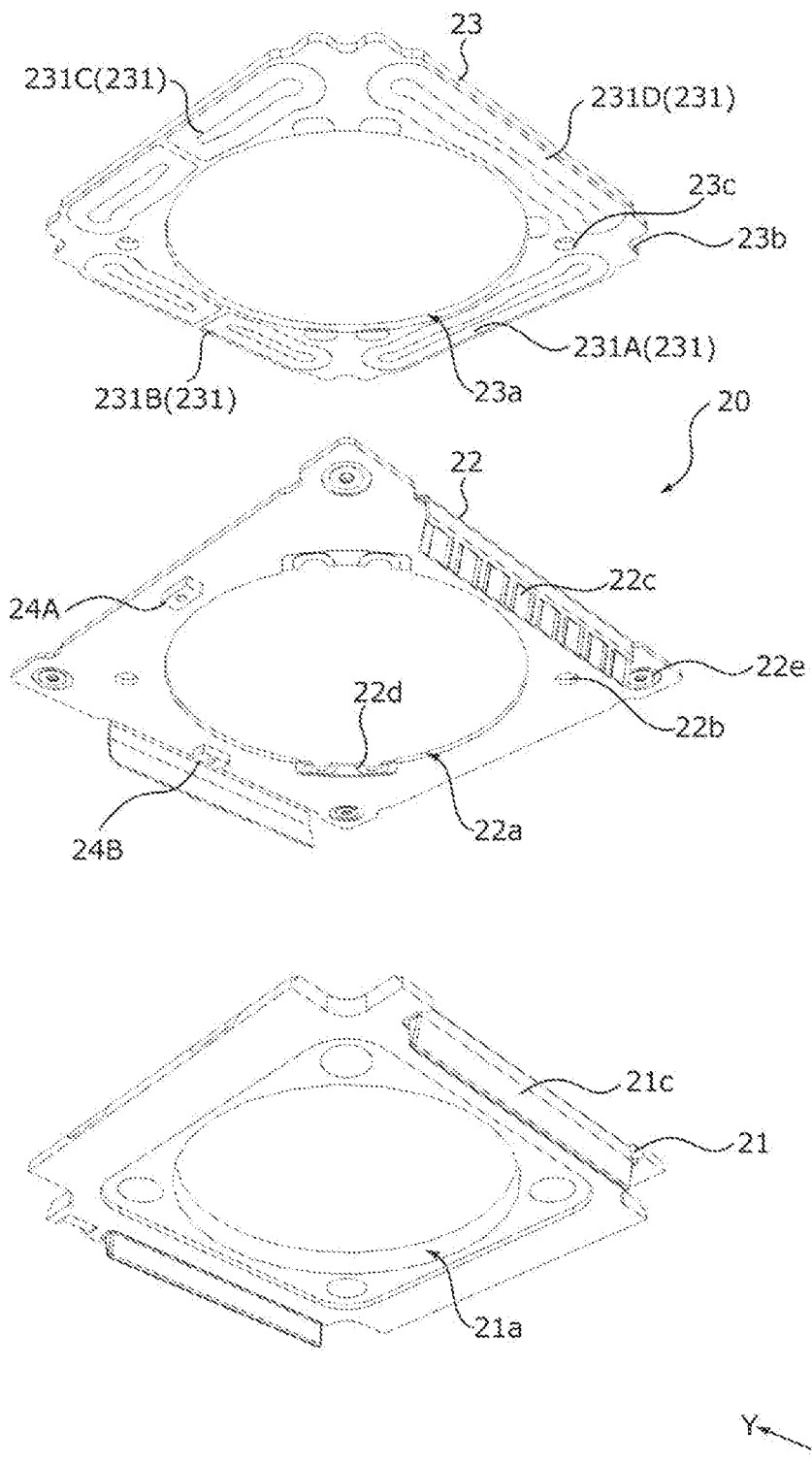
FIG. 14 is an exploded perspective view of the OIS fixing part.

FIGS. 13 and 14 are exploded perspective views of OIS fixing part 20. FIG. 13 is an upper perspective view and FIG. 14 is a lower perspective view. As illustrated in FIGS. 13 and 14, OIS fixing part 20 includes base 21, sensor board 22, coil board 23, XY-position detecting part 24, and the like.

Base 21 is a square member in plan view, and includes circular opening 21$a$ at the center of base 21. Base 21 includes positioning bosses 21$b$ on the rim portion of opening 21$a$ at positions corresponding to the positions of positioning holes 23$c$ of coil board 23 and positioning holes 22$b$ of sensor board 22.

Base 21 includes depressed portions 21$c$ in its peripheral edge portions at positons corresponding to control terminals 22$c$ of sensor board 22. Depressed portions 21$c$ have a tapered shape outwardly expanding in the direction of their lower portions. Base 21 also includes, at the rim portion of opening 21$a$, Hall-element housings 21$d$ adapted to house Hall elements 24A and 24B, and terminal housings 21$e$ adapted to house power-supply terminals 22$d$ of sensor board 22.

Coil board 23 is a board having a square shape in plan view and has circular opening 23$a$ at its center, similarly to base 21. Coil board 23 includes cutouts 23$b$ at the four corners. Coil board 23 also includes positioning holes 23$c$ in the rim portion of opening 23$a$ at two places where coil board 23 crosses the diagonal directions.

Coil board 23 includes OIS coil part 231 at positions where OIS coil part 231 faces magnet part 122 in the optical-axis direction. OIS coil part 231 includes four OIS coils 231A to 231D corresponding to permanent magnets 122A to 122D. The sizes and positions of OIS coils 231A to 231D and of permanent magnet 122A to 122D are set such that the magnetic fields radiated from the bottom surfaces of permanent magnets 122A to 122D traverse the long side portions of OIS coils 231A to 231D in the Z-direction. Magnet part 122 and OIS coil part 231 constitute the OIS voice coil motor.

Sensor board 22 is a board having a square shape in plan view and has circular opening 22$a$ at its center, similarly to base 21. Sensor board 22 has positioning holes 22$b$ in the rim portion of opening 22$a$ at positions corresponding to positioning holes 23$c$ of coil board 23. Sensor board 22 includes, at two sides extending along the Y-direction, terminals 22$c$ each formed to be bent downward. Terminals 22$c$ are electrically connected to the image capturing part (not illustrated).

Sensor board 22 includes power-supply terminals 22$d$ for supplying electricity to OIS coil part 231 at two places of the inner rim portion of opening 22$a$ where the inner rim portion crosses the diagonal directions. Sensor board 22 includes, at its four corners, wire fixing holes 22$e$ in which the other ends (lower ends) of suspension wires 30 are inserted.

Sensor board 22 also includes interconnection patterns including a power-supply line (not illustrated) for supplying electricity to OIS movable part 10 (AF control part 16) and to OIS coil part 231, a signal line (not illustrated) for detection signals to be output from XY-position detecting parts 24A and 24B, a signal line (not illustrated) for control signals for controlling autofocus operation of OIS movable part 10. XY-position detecting parts 24A and 24B for detecting the position of OIS movable part 10 in the XY plane are disposed on the back surface of sensor board 22.

XY-position detecting parts 24A and 24B are, for example, Hall elements that utilize the Hall effect to detect the magnetic field (hereinafter, XY-position detecting parts 24A and 24B may also be referred to as "Hall elements 24A and 24B"). Hall elements 24A and 24B are disposed on the undersurface of sensor board 22 substantially at the midpoints of two adjacent sides of sensor board 22, respectively. The position of OIS movable part 10 in the XY plane can be specified by detecting the magnetic field formed by magnet part 122 by Hall elements 24A and 24B. Note that, another position-detecting magnet may also be disposed to OIS movable part 10 in addition to magnet part 122.

In OIS fixing part 20, coil board 23 and sensor board 22 are bonded to each other by soldering. In this way, OIS coil part 231 is electrically connected to the power-supply line (not illustrated) of sensor board 22.

Positioning bosses 21$b$ of base 21 are fit in positioning holes 23$c$ of OIS coil board 23 and in positioning holes 22$b$ of sensor board 22, so that OIS coil board 23 and sensor board 22 are placed on base 21. Terminals 22$c$ of sensor board 22 are engaged with depressed portions 21$c$ of base 21, so that OIS coil board 23 and sensor board 22 are fixed to base 21.

In lens driving device 1, one ends of signal suspension wires 31A and 31B are inserted in and fixed by soldering to wire connection portions 174$c$ and 173$c$ of signal lines 174 and 173, respectively. One ends of power-supplying suspension wires 32A and 32B are inserted in and fixed by soldering to wire connection portions 172$c$ and 171$c$ of AF power-supply lines 172 and 171, respectively. In this way, suspension wires 30 are electrically connected to AF power-supply lines 171 and 172 and signal lines 173 and 174.

The other ends (lower ends) of suspension wires 30 are inserted in and fixed by soldering to wire fixing holes 22$e$ of sensor board 22. In this way, suspension wires 30 are electrically connected to the power-source line and signal line of sensor board 22. That is, the supply of electricity to AF control part 16 and the operational control of AF control part 16 are made possible via suspension wires 30 and upper elastic supporting member 13.

When the shake correction is performed in lens driving device 1, OIS coil part 231 are energized. Specifically, in the OIS driving part, the energization current through OIS coil part 231 is controlled based on a detection signal from a shake detection part (not illustrated) (for example, a gyro sensor) such that the shake of camera module A can be canceled out. At this time, by feedback of the detection result of XY-position detecting parts 24A and 24B, it becomes possible to accurately control the sway of OIS movable part 10.

When OIS coil part 231 is energized, a Lorentz force is generated at OIS coil part 231 by interaction between the magnetic field of magnet part 122 and a current flowing through OIS coil part 231 (Fleming's left hand rule). The direction of the Lorentz force is a direction (X- or Y-direction) orthogonal both to the direction of the magnetic field (Z-direction) at one of the long side portions of OIS coil part 231 and to the direction of the current (Y- or X-direction). Since OIS coil part 231 is fixed, a reactive force is exerted on magnet part 122. With this reactive force serving as the driving force of the OIS voice coil motor, OIS movable part 10 including magnet part 122 sways in the XY plane, so that the shake correction is performed.

When automatic focusing is performed in lens driving device 1, AF coil part 112 is energized. The energization current through AF coil part 112 is controlled by AF control part 16 (control IC 161). Specifically, control IC 161 controls the energization current to AF coil part 112 based on the control signals provided via suspension wires 31A and 31B and signal lines 174 and 173 and based on the detection result of a built-in Hall element (not illustrated) included in control IC 161.

When AF coil part 112 is energized, the Lorentz force arises at AF coil part 112 by interaction between the magnetic field of magnet part 122 and the current flowing through AF coil 112 part. The direction of the Lorentz force is the direction (Z-direction) orthogonal both to the direction of the magnetic field (X- or Y-direction) and to the direction of current flowing through AF coil part 112 (Y- or X-direction). Since magnet part 122 is fixed, a reactive force acts on AF coil part 112. With this reactive force serving as the driving force of the AF voice coil motor, AF movable part 11 including AF coil part 112 moves in the optical-axis direction, so that focusing is performed.

In AF control part 16 of lens driving device 1, the closed loop control is performed based on the detection signal obtained by the built-in Hall element included in control IC 161. With the closed-loop control system, it is unnecessary to take into consideration the hysteresis characteristics of the voice coil motor, and it is possible to directly detect that the position of AF movable part 11 is stabilized. Moreover, the present invention is also applicable to automatic focusing of an image surface detection system. Thus, since the response performance is high, higher-speed automatic focusing operation can be achieved.

Here, in an non-energization state where automatic focusing is not being performed, AF movable part 11 is brought into a state where AF movable part 11 is suspended between the infinity position and the macro position by upper plate springs 131 and 132 and lower plate spring 14 (this state may hereinafter be referred to as "reference state"). That is, in OIS movable part 10, AF movable part 11 (lens holder 111) is elastically supported to be displaceable on both sides in the Z-direction while being positioned with respect to AF fixing part 12 (magnet holder 121) by upper plate springs 131 and 132 and lower plate springs 14.

When focusing is performed, the direction of current is controlled depending on toward which side of the macro position side and the infinity position side AF movable part 11 is to be moved from the reference state. In addition, the magnitude of current is controlled depending on the moving distance of AF movable part 11.

In the case where AF movable part 11 moves toward the infinity position side during focusing, the undersurfaces of first stopper portions 111h of lens holder 111 approach the upper surface of magnet part 122, and eventually come into contact therewith. That is, the movement toward the infinity position side is restricted by the undersurfaces of first stopper portions 111h of lens holder 111 and the upper surface of magnet part 122.

Meanwhile, in the case where AF movable part 11 moves toward the macro position side during focusing, the upper surface of flange portion 111b of lens holder 111 approaches the undersurface of second stopper portion 121e of magnet holder 121, and eventually comes into contact therewith. That is, the movement toward the macro position side is restricted by the upper surface of flange portion 111b of lens holder 111 and the undersurface of second stopper portion 121e of magnet holder 121.

As described above, lens driving device 1 includes the auto-focusing driving part including: AF coil part 112 to be disposed at the periphery of the lens part (not illustrated); magnet part 122 (AF magnet part) to be disposed to be radially spaced apart from AF coil part 112; and AF supporting member 13 (upper plate springs 131 and 132) configured to support, with respect to AF fixing part 12 including magnet part 122, AF movable part 11 including AF coil part 112, AF movable part 11 being supported to be movable in the optical-axis direction. The auto-focusing driving part is configured to perform automatic focusing by utilizing the driving force of the voice coil motor composed of AF coil part 112 and AF magnet part 122. Lens driving device 1 includes the shake-correcting driving part including: magnet part 122 (shake-correcting magnet part) to be disposed in the AF driving part; OIS coil part 231 to be disposed to be spaced apart from magnet part 122 in the optical-axis direction; and OIS supporting member 30 configured to support, with respect to OIS fixing part 20 including OIS coil part 231, OIS movable part 10 including magnet part 122, OIS movable part 10 being supported to be able to sway in the optical-axis-orthogonal plane. The shake-correcting driving part is configured to perform shake correction by utilizing the driving force of the voice coil motor composed of OIS coil part 231 and magnet part 122. OIS supporting member 30 is composed of a pair of power-supplying suspension wires 32A and 32B and a pair of signal suspension wires 31A and 31B, and couples OIS fixing part 20 (sensor board 22) to AF fixing part 12 (magnet holder 121). AF movable part 11 includes position-detecting magnet 15A. AF fixing part 12 includes a pair of AF power-supply lines 172 and 171 to be connected to a pair of power-supplying suspension wires 32A and 32B, a pair of signal lines 174 and 173 to be connected to a pair of signal suspension wires 31A and 31B, AF control part 16 to be electrically connected to power-supplying suspension wires 32A and 32B and to signal suspension wires 31A and 31B via AF power-supply lines 172 and 171 and via signal lines 174 and 173, and upper plate springs 131 and 132 (coil power-supply lines) configured to electrically connect AF control part 16 to AF coil part 112. AF control part 16 includes: a Hall element (not illustrated) to be disposed to face position-detecting magnet 15A, the Hall element being configured to detect the position of AF movable part 11 in the optical-axis direction based on the change in magnetic field; a coil control part configured to control the energization current through AF coil part 112 based on the control signal to be provided via the pair of signal suspension wires 31A and 31B and based on the detection result of the Hall element; AF circuit board 162 on which the Hall element and the coil control part are mounted.

According to lens driving device 1, since AF control part 16 includes the Z-position detecting part (Hall element) and the coil control part, and the closed-loop control based on the detection result of the Z-position detecting part is completed in AF control part 16, it is enough only to supply electricity and the control signal to AF control part 16 by four suspension wires 31A, 31B, 32A, and 32B. Therefore, it is possible to simplify the configuration of the OIS supporting member used for driving of the AF coil part and the position detecting part, and it is also possible to improve the reliability of the AF driving part.

While the invention made by the present inventor has been specifically described based on the preferred embodiments, it is not intended to limit the present invention to the above-mentioned preferred embodiments but the present invention may be further modified within the scope and spirit of the invention defined by the appended claims.

By way of an example, although the embodiments of the present invention have been described in relation to the case where one control IC 161 includes the built-in Hall element and the built-in coil control part, the Hall element and the coil control part may be mounted, as separate ICs, on AF printed wiring board 162.

By way of another example, the coil power-supply lines used as the power-supplying path from AF control part 16 to AF coil part 112 may also be installed separately from upper plate springs 131 and 132. However, since this modification results in a complicated structure, it is preferable that upper plate springs 131 and 132 function as the coil power-supply lines.

While a smartphone serving as a camera-equipped mobile terminal is described in the embodiment as an example of a camera mounting device having camera module A, the present invention is applicable to a camera mounting device serving as an information apparatus or a transport apparatus. The camera-mounted device serving as an information device is an information device including a camera module and a control section that processes image information obtained with the camera module, and examples of such a camera-mounted device include a camera-equipped mobile phone, a note-type personal computer, a tablet terminal, a mobile game machine, a web camera, and a camera-equipped in-vehicle apparatus (for example, a rear-view monitor apparatus or a drive recorder apparatus). In addition, the camera-mounted device serving as a transporting device is a transporting device including a camera module and a control part that processes an image obtained with the camera module, and examples of such a camera-mounted device include an automobile.

Figure 15A:
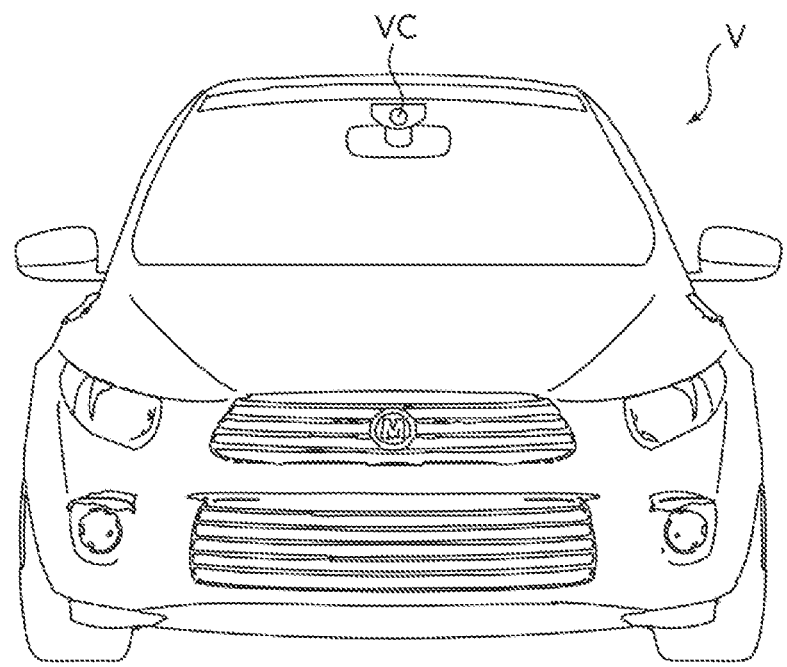
FIGS. 15A and 15B illustrate an automobile as a camera-mounted device in which an in-vehicle camera module is mounted.
Figure 15B:
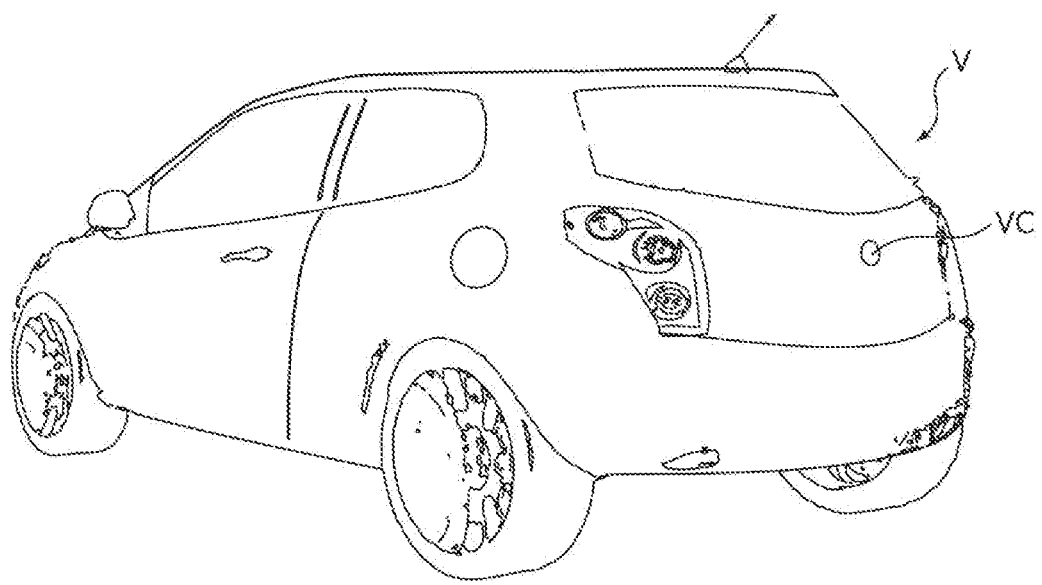

FIGS. 15A and 15B illustrate automobile V serving as a camera mounting device in which an in-vehicle camera module VC (Vehicle Camera) is mounted. FIG. 15A is a front view of automobile V and FIG. 15B is a rear perspective view of automobile V. In automobile V, camera module A described in the embodiments is mounted as in-vehicle camera module VC. As illustrated in FIGS. 15A and 15B, in-vehicle camera module VC may, for example, be attached to the windshield so as to face forward, or to the rear gate so as to face backward. Onboard camera module VC is used for rear monitoring, drive recording, collision avoidance control, automatic drive control, and the like.

The embodiments disclosed herein are merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

REFERENCE SIGNS LIST

1 Lens driving device
2 Cover
10 OIS movable part (AF driving part)
11 AF movable part
12 AF fixing part
13 Upper elastic supporting member (AF supporting member)
14 Lower elastic supporting member
15A Position-detecting magnet
16 AF control part
20 OIS fixing part
21 Base
22 Sensor board
23 Coil board
30 OIS supporting member
31A, 31B Signal suspension wire
32A, 32B Power-supplying suspension wire
111 Lens holder
112 AF coil part
121 Magnet holder
122 Magnet part (AF magnet part, OIS magnet part)
122A to 122D Permanent magnets
131, 132 Upper plate spring (coil power-supply line)
171, 172 AF power-supply line
173, 174 Signal line
161 Control IC
162 AF circuit board
231 OIS coil part
M Smartphone
A Camera module

The invention claimed is:

1. A lens driving device, comprising:
an auto-focusing driving part including:
an auto-focusing coil part to be disposed at a periphery of a lens part,
an auto-focusing magnet part to be disposed to be radially spaced apart from the auto-focusing coil part, and
an auto-focusing supporting member configured to support, with respect to an autofocus fixing part including the auto-focusing magnet part, an autofocus movable part including the auto-focusing coil part, the autofocus movable part being supported to be movable in an optical-axis direction, the auto-focusing driving part being configured to perform automatic focusing by utilizing a driving force of a voice coil motor composed of the auto-focusing coil part and the auto-focusing magnet part; and
a shake-correcting driving part including:
a shake-correcting magnet part to be disposed in the auto-focusing driving part,
a shake-correcting coil part to be disposed to be spaced apart from the shake-correcting magnet part in the optical-axis direction, and
a shake-correcting supporting member configured to support, with respect to a shake-correcting fixing part including the shake-correcting coil part, a shake-correcting movable part including the shake-correcting magnet part, the shake-correcting movable part being supported to be able to sway in an optical-axis-orthogonal plane, the shake-correcting driving part being configured to perform shake correction by utilizing a driving force of an another voice coil motor composed of the shake-correcting coil part and the shake-correcting magnet part,
wherein the shake-correcting supporting member is composed of a pair of power-supplying suspension wires and a pair of signal suspension wires, the shake-correcting supporting member connecting the shake-correcting fixing part to the autofocus fixing part, wherein the autofocus movable part includes a position-detecting magnet,
wherein the autofocus fixing part includes:
a pair of auto-focusing power-source lines to be connected to the pair of power-supplying suspension wires,
a pair of signal lines to be connected to the pair of signal suspension wires,
an auto-focusing control part to be electrically connected to the pair of power-supplying suspension wires and the pair of signal suspension wires via the pair of auto-focusing power-source lines and the pair of signal lines, and
a coil power-supply line configured to electrically connect the auto-focusing control part to the auto-focusing coil part, and
wherein the auto-focusing control part includes:
a Hall element to be disposed to face the position-detecting magnet, the Hall element being configured to detect a position of the autofocus movable part in the optical-axis direction based on a change in magnetic field,
a coil control part configured to control an energization current through the auto-focusing coil part based on a control signal to be provided via the pair of signal suspension wires and based on a detection result of the Hall element, and
an auto-focusing circuit board on which the Hall element and the coil control part are to be mounted,
wherein the auto-focusing power-source lines, the signal lines and the coil power-supply line are disposed on the same plane of the light reception side in the optical axis direction of the autofocus fixing part in such a manner as not to be in contact with one another.

2. The lens driving device according to claim 1, wherein the Hall element and the coil control part are respectively a built-in Hall element and a built-in coil control part included in a single Integrated Circuit.

3. The lens driving device according to claim 1, wherein the auto-focusing supporting member functions as the coil power-supply line and are disposed on the inner side the auto-focusing power-source lines and the signal lines.

4. The lens driving device according to claim 1,
wherein the autofocus fixing part includes a magnet holder, the magnet holder including:
a rectangular frame,
a magnet holding portion configured to hold the auto-focusing magnet part along four sides of the rectangular frame, and
a housing in which the auto-focusing control part is to be disposed,
wherein the autofocus movable part includes a lens holder, the lens holder including a cylindrical lens housing and a coil winding portion on which the auto-focusing coil part is to be wound,
wherein the lens holder is disposed inside the magnet holder such that the auto-focusing coil part faces the auto-focusing magnet part, and
wherein the pair of auto-focusing power-source lines, the pair of signal lines, and the coil power-supply line, as a whole, have a shape similar to a shape of the rectangular frame, and are routed on or above the rectangular frame.

5. A camera module, comprising:
the lens driving device according to claim 1;
a lens part to be mounted on the autofocus movable part; and
an image capturing part configured to capture a subject image imaged by the lens part.

6. A camera-mounted device that is an information device or a transporting device, the camera-mounted device comprising:
the camera module according to claim 5; and
a control part configured to process image information obtained by the camera module.

* * * * *